US011807022B2

(12) United States Patent
Contractor et al.

(10) Patent No.: US 11,807,022 B2
(45) Date of Patent: Nov. 7, 2023

(54) HYBRID WET ON WET PRINTING METHODS

(71) Applicant: Kao Corporation, Tokyo (JP)

(72) Inventors: Muslim Contractor, Mason, OH (US); Stephen Buchanan, Mason, OH (US); Stephen Cummings, Mason, OH (US)

(73) Assignee: Kao Corporation, Tokyo (JP)

( * ) Notice: Subject to any disclaimer, the term of this patent is extended or adjusted under 35 U.S.C. 154(b) by 472 days.

(21) Appl. No.: 17/267,702

(22) PCT Filed: Sep. 4, 2019

(86) PCT No.: PCT/US2019/049509
§ 371 (c)(1),
(2) Date: Feb. 10, 2021

(87) PCT Pub. No.: WO2020/072166
PCT Pub. Date: Apr. 9, 2020

(65) Prior Publication Data
US 2022/0111673 A1   Apr. 14, 2022

Related U.S. Application Data

(60) Provisional application No. 62/727,062, filed on Sep. 5, 2018.

(51) Int. Cl.
*B41M 3/00*    (2006.01)
*B41M 7/00*    (2006.01)
(Continued)

(52) U.S. Cl.
CPC ............ *B41M 3/008* (2013.01); *B41J 11/002* (2013.01); *B41M 1/18* (2013.01); *B41M 5/0017* (2013.01);
(Continued)

(58) Field of Classification Search
CPC ........ B41J 11/002; B41M 1/18; B41M 3/008; B41M 5/0017; B41M 5/50; B41M 7/0045; B41M 7/0081; C09D 11/101
See application file for complete search history.

(56) References Cited

U.S. PATENT DOCUMENTS 6,665,095 B1    12/2003  Janssen et al.
2009/0000508 A1  1/2009  Edison et al.
(Continued)

FOREIGN PATENT DOCUMENTS

CN    1984974 A     6/2007
CN    101835853 A   9/2010
(Continued)

OTHER PUBLICATIONS

Mathews, N. et al., "Printing materials for electronic devices," International Journal of Materials Research 101.2, Feb. 2010, pp. 236-250.
(Continued)

*Primary Examiner* — Anh T Vo
(74) *Attorney, Agent, or Firm* — Oblon, McClelland, Maier & Neustadt, L.L.P.

(57) ABSTRACT

A method of forming an image on a substrate that includes applying a radiation curable analog ink composition by an analog printing method onto a surface of the substrate to form a coated substrate, applying a radiation curable inkjet ink composition by a digital printing method onto the coated substrate while the radiation curable analog ink composition is still wet to form a hybrid coated substrate, and exposing to electron beam radiation. A method of forming an image on a substrate that includes applying a radiation curable inkjet ink composition by a digital printing method onto a surface of the substrate to form a coated substrate, applying a radiation curable analog ink composition by an analog printing method onto the coated substrate while the radiation
(Continued)

curable inkjet ink composition is still wet to form a hybrid coated substrate, and exposing to electron beam radiation.

20 Claims, 2 Drawing Sheets

(51) Int. Cl.
  *B41M 1/18* (2006.01)
  *B41M 5/50* (2006.01)
  *C09D 11/101* (2014.01)
  *B41M 5/00* (2006.01)
  *B41J 11/00* (2006.01)

(52) U.S. Cl.
  CPC ............ *B41M 5/50* (2013.01); *B41M 7/0045* (2013.01); *B41M 7/0081* (2013.01); *C09D 11/101* (2013.01)

(56) References Cited

U.S. PATENT DOCUMENTS

| | | | |
|---|---|---|---|
| 2010/0196621 A1* | 8/2010 | Larson-Smith | C09D 183/14 427/539 |
| 2010/0331478 A1 | 12/2010 | Claes | |
| 2012/0108746 A1 | 5/2012 | Claes | |
| 2014/0327452 A1 | 11/2014 | Petcavich et al. | |
| 2014/0349130 A1 | 11/2014 | Petcavich et al. | |
| 2015/0258772 A1 | 9/2015 | Jin et al. | |
| 2015/0267071 A1 | 9/2015 | Jin et al. | |
| 2015/0275040 A1 | 10/2015 | Shi et al. | |
| 2017/0029629 A1 | 2/2017 | Petcavich et al. | |

FOREIGN PATENT DOCUMENTS

| | | | |
|---|---|---|---|
| CN | 106414629 A | 2/2017 | |
| WO | WO 2009/079572 A1 | 6/2009 | |
| WO | WO 2009079572 A1 * | 6/2009 | ............. B41J 3/546 |

OTHER PUBLICATIONS

International Search Report and Written Opinion dated May 1, 2020 in PCT/US2019/049509 filed on Sep. 4, 2019.

Xiaokun Qi, et al., "Printing Materials and Suitability" (2nd Edition), Printing Industry Press, pp. 162-163 (with English Translation for pertinent part of cited Common Knowledge Evidence).

* cited by examiner

HYBRID WET ON WET PRINTING METHODS

CROSS REFERENCE TO RELATED APPLICATION

This application is a national stage entry under 35 USC 371 of PCT/US2019/049509, filed on Sep. 4, 2019, and claims priority to U.S. Patent Application No. 62/727,062 filed on Sep. 5, 2018.

BACKGROUND OF THE INVENTION

Field of the Invention

The present invention relates to hybrid wet on wet printing methods using radiation curable inkjet ink compositions and radiation curable analog ink compositions.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Good print quality generally involves a rapid formation of a solid ink dot from the applied ink, concentration of any ink colorants on the surface of the substrate without absorption into the surface of the substrate, control of the spread of the ink dot formed on the surface of the substrate, limited merging or bleed of one ink dot into a neighboring ink dot of a different color, and uniformity of color and color density over the solid area of print formed from the droplets.

In printing processes that require sequential application of multiple ink types, the simplest approach to achieve high quality prints is to dry and/or cure each applied ink layer prior to the application of a subsequent ink layer. However, the additional drying and/or curing steps require time and energy to accomplish, and as a result, productivity is reduced and production costs increase.

In an effort to accelerate the printing process and lower production costs, wet trapping (wet on wet printing) was developed, whereby the ink layer deposited or applied at each inking station is not dried before the next ink layer is deposited thereover. For example, WO 2009/079572 A1 describes a printing press having sequential printing stations arranged on a central impression drum for wet trapping. To implement wet trapping, each ink composition is formulated to have different surface properties than the previously applied ink (e.g., surface tension, viscosity, tack, etc.), so that the previously applied ink traps, so to speak, the subsequent layer to minimize merging or bleeding.

SUMMARY OF THE INVENTION

Despite the great efforts to formulate inks with differing surface properties for use in wet on wet processes, it is often difficult to completely avoid merging or bleeding between the different ink types, often leading to low color strength, mottling, puddling, a lack of sharp lines, undesirable color rendition, and an overall aesthetically unpleasing image. These outcomes are particularly problematic when high quality image reproduction is desired, as is the case in high-value packaging applications, prints involving text, high resolution print jobs, or special effect printing.

In view of the forgoing, there is a need for wet on wet printing methods that form sharp, clear, high quality images, while increasing printing speeds and reducing energy costs associated with methods involving multiple drying and/or curing operations.

Accordingly, it is one object of the present invention to provide novel methods of forming an image on a substrate by applying a radiation curable analog ink composition by an analog printing method, applying a radiation curable inkjet ink composition by a digital printing method, and exposing to electron beam radiation.

It is another object of the present invention to provide novel methods of forming an image on a substrate by applying a radiation curable inkjet ink composition by a digital printing method, applying a radiation curable analog ink composition by an analog printing method, and exposing to electron beam radiation.

These and other objects, which will become apparent during the following detailed description, have been achieved by the inventors' discovery that high quality prints can be produced using the following hybrid wet on wet printing method that involves a combination of radiation curable analog and digital inks.

Thus, the present invention provides:

(1) A method of forming an image on a substrate, comprising:
applying a radiation curable analog ink composition by an analog printing method onto a surface of the substrate to form a coated substrate;
applying a radiation curable inkjet ink composition by a digital printing method onto the coated substrate while the radiation curable analog ink composition is still wet to form a hybrid coated substrate; and
exposing the hybrid coated substrate to electron beam radiation to at least partially cure the radiation curable analog ink composition and the radiation curable inkjet ink composition:
wherein the radiation curable inkjet ink composition has a surface tension that is lower than a surface tension of the radiation curable analog ink composition.

(2) The method of (1), wherein the radiation curable analog ink composition, the radiation curable inkjet ink composition, or both comprises an ethylenically unsaturated oligomer and an ethylenically unsaturated monomer.

(3) The method of (2), wherein the radiation curable analog ink composition, the radiation curable inkjet ink composition, or both further comprises at least one of a surfactant, a colorant, a stabilizer, a gloss and viscosity control additive, an optical brightening agent, and a security taggant.

(4) The method of any one of (1) to (3), wherein the analog printing method is a flexographic printing method or a gravure printing method.

(5) The method of any one of (1) to (4), wherein the digital printing method is a piezoelectric inkjet printing method.

(6) The method of any one of (1) to (5), wherein the image comprises a cured analog ink composition and a cured inkjet ink composition, and wherein the cured analog ink composition and the cured inkjet ink composition are distinguishable by at least one physical attribute selected from the group consisting of color and gloss.

(7) The method of any one of (1) to (6), wherein the substrate is a packaging material.

(8) The method of any one of (1) to (7), wherein the radiation curable inkjet ink composition has a surface tension that is at least 1.5 mN/m lower than a surface tension of the radiation curable analog ink composition.

(9) The method of any one of (1) to (8), wherein the coated substrate is not cured or pinned.

(10) A method of forming an image on a substrate, comprising:

applying a radiation curable inkjet ink composition by a digital printing method onto a surface of the substrate to form a coated substrate;

applying a radiation curable analog ink composition by an analog printing method onto the coated substrate while the radiation curable inkjet ink composition is still wet to form a hybrid coated substrate; and exposing the hybrid coated substrate to electron beam radiation to at least partially cure the radiation curable inkjet ink composition and the radiation curable analog ink composition;

wherein the radiation curable inkjet ink composition has a surface tension that is higher than a surface tension of the radiation curable analog ink composition.

(11) The method of (10), wherein the radiation curable analog ink composition, the radiation curable inkjet ink composition, or both comprises an ethylenically unsaturated oligomer and an ethylenically unsaturated monomer.

(12) The method of (11), wherein the radiation curable analog ink composition, the radiation curable inkjet ink composition, or both further comprises at least one of a surfactant, a colorant, a stabilizer, a gloss and viscosity control additive, an optical brightening agent, and a security taggant.

(13) The method of any one of (10) to (12), wherein the analog printing method is a flexographic printing method or a gravure printing method.

(14) The method of any one of (10) to (13), wherein the digital printing method is a piezoelectric inkjet printing method.

(15) The method of any one of (10) to (14), wherein the image comprises a cured analog ink composition and a cured inkjet ink composition, and wherein the cured analog ink composition and the cured inkjet ink composition are distinguishable by at least one physical attribute selected from the group consisting of color and gloss.

(16) The method of any one of (10) to (15), wherein the substrate is a packaging material.

(17) The method of any one of (10) to (16), wherein the radiation curable inkjet ink composition has a surface tension that is at least 1.5 mN/m higher than a surface tension of the radiation curable analog ink composition.

(18) The method of any one of (10) to (17), wherein the coated substrate is not cured or pinned.

BRIEF DESCRIPTION OF THE DRAWINGS

The foregoing paragraphs have been provided by way of general introduction, and are not intended to limit the scope of the following claims. The described embodiments, together with further advantages, will be best understood by reference to the following detailed description when considered in conjunction with the accompanying drawings, wherein:

DETAILED DESCRIPTION OF THE INVENTION

Figure 1:
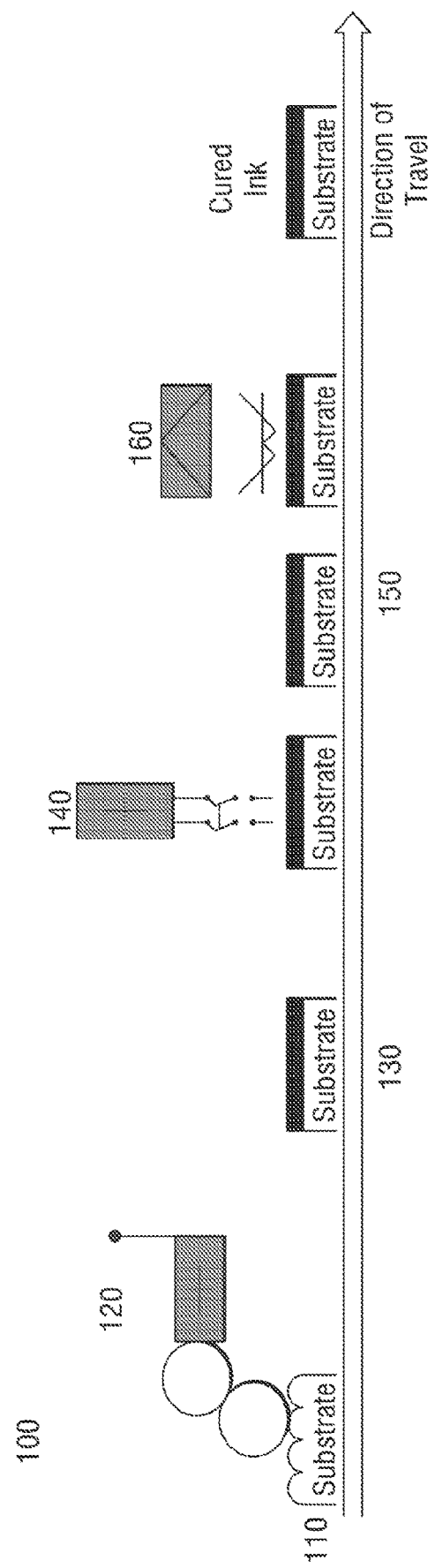
FIG. 1 is an illustration of a printing line involving sequential application of a radiation curable analog ink composition and a radiation curable inkjet ink composition in a hybrid wet on wet printing method.

In the following description, it is understood that other embodiments may be utilized and structural and operational changes may be made without departure from the scope of the present embodiments disclosed herein.

Definitions

The term "curable" describes, for example, an ink composition with an ability to polymerize, harden, and/or cross-link in response to a suitable curing stimulus such as actinic radiation (e.g., ultraviolet (UV) energy, infrared (IR) energy, for example from a light emitting diode (LED)), electron beam (EB) energy, heat energy, or other source of energy. A curable ink composition typically is liquid at 25° C. prior to curing. A curable ink composition can be used to print on a substrate, forming a film of printed ink or coating. The film of curable ink is cured by hardening, polymerizing and/or cross-linking the ink or coating to form a cured ink. The term "radiation curable" refers, for example, to all forms of curing upon exposure to a radiation source, including light sources (e.g., actinic radiation, such as ultraviolet (UV) light or more rarely visible light), a heat source, and an accelerated particle source (e.g., electron beam (EB) radiation), each in the presence or absence of initiators, and appropriate combinations thereof.

As used herein, the term "cured" refers to a curable ink composition whereby curable components present in the curable ink composition have undergone polymerization, crosslinking, or hardening to form a polymerized or cross-linked network, and includes both partially cured and substantially cured ink compositions. When the curable ink composition cures from a liquid state to a solid state, the curable monomers and/or oligomers form (1) chemical bonds, (2) mechanical bonds, or (3) a combination of a chemical and mechanical bonds. As used herein, "partially cured" or "partially cure" refers to a curable ink composition where 10 to 75 wt. % of the curable functional groups present in the starting composition are polymerized and/or crosslinked, for example 20 to 60 wt. %, or 30 to 55 wt. %, or 40 to 50 wt. %, and the term "substantially cured" or "substantially cure" refers to a curable ink composition where more than 75 wt. %, preferably more than 80 wt. %, more preferably more than 90 wt. % of the curable functional groups present in the starting composition undergo conversion (i.e., polymerized and/or crosslinked). Likewise, "at least partially cured" or "at least partially cure" refers to a curable ink composition where at least 10 wt. %, preferably at least 30 wt. %, more preferably at least 40 wt. %, even more preferably at least 50 wt. % (and up to 100 wt. %) of the curable functional groups present in the starting composition have been polymerized and/or crosslinked. "Pinning" is a term of the art that describes sufficiently curing an ink composition to move the ink droplets to a higher viscosity state and immobilizing the ink on the underlying surface, but without completely curing the ink composition. Pinning thus results in a partial cure. The degree of curing described above may be quantified by measuring percent reacted ethylenically unsaturated groups using Fourier Transform Infrared spectroscopy (FTIR).

Suitable ethylenically unsaturated groups that may be cured in the present ink compositions include acrylate, methacrylate, acrylamide, methacrylamide, vinyl, allyl, or other ethylenically unsaturated functional groups. The materials including such groups can be in the form of monomers, oligomers, and/or polymers, or mixtures thereof. As used herein, the term "monomer" is a compound whose molecules can join together to form oligomers or polymers. "Oligomers" as used herein is a polymeric compound containing relatively few structural units (i.e., 2, 3, or 4 repeat units). A "polymer" as used herein is a large molecule, or macromolecule, composed of many repeated structural units (i.e., 5 or more repeat units). Ethylenically unsaturated alkoxylated compounds are excluded from the definition of an oligomer and are herein considered monomers unless indicated otherwise. For example, propoxylated neopentyl glycol diacrylate is considered a monomer.

As used herein, "mono-ethylenically unsaturated" refers to components (monomers or oligomers) of the radiation curable inks which have one ethylenically unsaturated group per molecule, while "poly-ethylenically unsaturated" refers to those components (monomers or oligomers) having two or more (e.g., 2, 3, 4, 5, 6, 7, 8, etc.) ethylenically unsaturated groups per molecule. For example a "mono-ethylenically unsaturated oligomer" refers to an oligomeric material containing one ethylenically unsaturated group that may participate in curing when exposed to a radiation source.

The different ink compositions employed in the disclosed methods are defined by the method used to apply them. Thus, the radiation curable analog ink composition refers to inks applied via analog printing methods, while the radiation curable inkjet ink composition refers to inks applied via digital printing methods. As used herein, the phrase "radiation curable inks" refers to the radiation curable inkjet ink compositions and the radiation curable analog ink compositions, collectively, and therefore the description that follows can be applied to either the radiation curable inkjet ink compositions, the radiation curable analog ink composition, or both. For example, when it is stated that the "radiation curable inks" may include a mono-ethylenically unsaturated monomer, that is to mean that the mono-ethylenically unsaturated monomer may be included in either, or both, of the radiation curable inkjet ink compositions or the radiation curable analog ink composition, unless specifically stated otherwise.

As used herein "hybrid" refers to methods that involve at least one application of a radiation curable analog ink composition through an analog printing method and at least one application of a radiation curable inkjet ink composition through a digital printing method. Likewise, a "hybrid coated substrate" refers to a substrate which has received at least one application of radiation curable analog ink composition and at least one application of a radiation curable inkjet ink composition.

When referencing radiation curable inks, the phrase "substantially free", unless otherwise specified, describes an amount of a particular component (e.g., a photoinitiator) present in the ink composition being less than about 1 wt. %, preferably less than about 0.5 wt. %, more preferably less than about 0.1 wt. %, even more preferably less than about 0.05 wt. %, yet even more preferably 0 wt. %, relative to a total weight of the radiation curable ink.

As used herein, the terms "optional" or "optionally" means that the subsequently described event(s) can or cannot occur or the subsequently described component(s) may or may not be present (e.g., 0 wt. %).

High surface area coverage describes application of the radiation curable inks onto greater than or equal to 50%, preferably greater than or equal to 60%, preferably greater than or equal to 70%, preferably greater than or equal to 80%, preferably greater than or equal to 90%, preferably greater than or equal to 95%, preferably greater than or equal to 99% of the exposed surface area of the substrate (i.e., the total surface area of the substrate that is available for receiving inks). "Low surface area coverage", on the other hand, describes application of the radiation curable inks onto less than 50%, preferably less than 40%, preferably less than 30%, preferably less than 20%, preferably less than 10%, preferably less than 5%, preferably less than 1% of the exposed surface area of the substrate.

As used herein, the term "surface tension" refers to the force that holds a fluid together in the presence of air within its own confines, i.e., the tangential intermolecular force of attraction between adjacent molecules. Surface tension dictates whether a coating will wet and spread over, or retract from, a surface on which the coating is applied. The surface tension of the radiation curable inks may be measured based on the wetting force acting on a measuring probe of a force tensiometer using the ring and plate method, for example, with a deNouy ring and a Wilhelmy plate using a $K_2O$ force tensiometer (Kruss GmBH, Easy Dyne).

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3, ARES rheometer, both made by Rheometrics, a division of TA Instruments, or a Haake Roto Visco 1 rheometer, Brookfield DV-E Viscometer made by AMETEK Brookfield and a TCP/P-Peltier Temperature Control Unit. The results are provided in centipoise (cP).

Methods of Forming an Image

Wet trapping, or "wet on wet" printing, is a printing process in which a first layer of ink deposited at a first inking station is not dry when a second layer of ink is applied to the first layer at a second inking station. In other words, the first layer of ink is not subjected to solidification (e.g., curing, drying, pinning, etc.) prior to application of a subsequent ink, hence "wet on wet". This lack of a solidification step in between ink applications defines the "wet on wet" process, which differs from standard methods which involve irradiation (e.g., curing, pinning, etc.) or drying in between ink applications. Compared to standard methods, wet on wet printing techniques offer improved printing speeds and reduced costs since multiple curing, drying, or pinning stages can be avoided.

The most common problems associated with wet on wet printing are mottling, puddling and the lack of sharp lines. Mottling and puddling are related to the variation of color density across an area of print, while the sharpness of line edges is important in achieving clear images in, for example, text. In the most basic terms, these problems arise in wet on wet printing methods due to mixing of applied inks, which can impact dot gain (or ink drop spreading) on a layer by layer basis, resulting in poor color gamut, grain/optical density, and overall image clarity.

The present disclosure thus provides a wet on wet method of forming an image on a substrate through a "hybrid" method that involves a combination of analog and digital printing methods that overcomes the limitations commonly associated with wet on wet printing processes.

Figure 2:
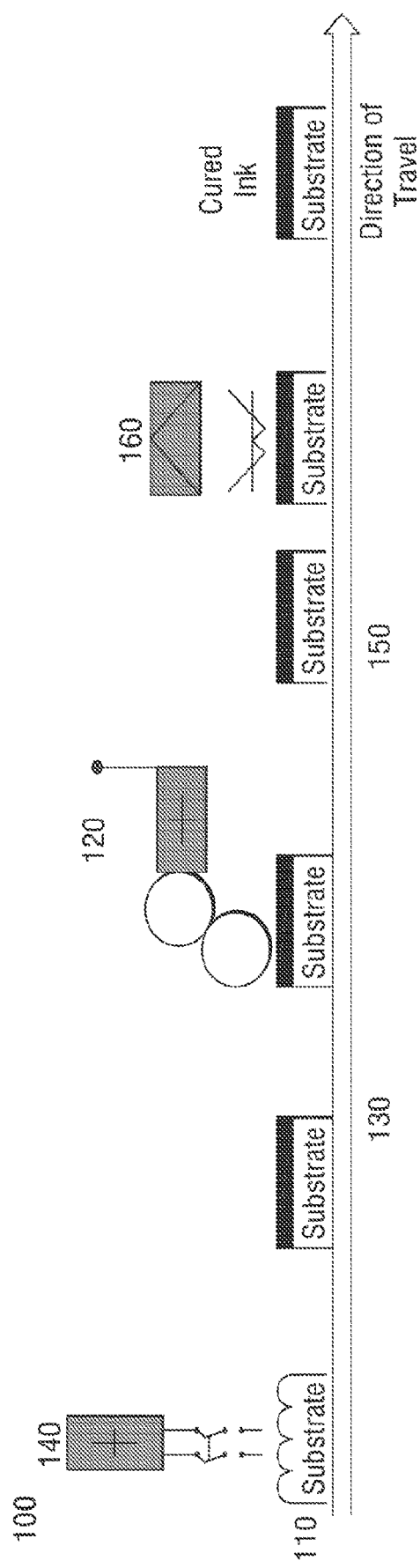
FIG. 2 is an illustration of a printing line involving sequential application of a radiation curable inkjet ink composition and a radiation curable analog ink composition in a hybrid wet on wet printing method.

Referring now to the drawings. The application order can be varied depending on the desired image and the substrate to be printed on. For example, as illustrated in the printing line (100) in FIG. 1, the method may involve applying a radiation curable analog ink composition at an analog inking station (120) by an analog printing method onto a surface of the substrate (110) to form a coated substrate (130), applying a radiation curable inkjet ink composition at a digital inking station (140) by a digital printing method onto the coated substrate (130) while the radiation curable analog ink composition is still wet to form a hybrid coated substrate (150), and exposing the hybrid coated substrate (150) to curing radiation (e.g., electron beam radiation) at a curing station (160) to at least partially cure, preferably substantially cure, the radiation curable analog ink composition and the radiation curable inkjet ink composition. Alternatively, as illustrated in the printing line (101) in FIG. 2, the method may involve applying a radiation curable inkjet ink composition at a digital inking station (140) by a digital printing method onto a surface of the substrate (110) to form a coated substrate (130), applying a radiation curable analog ink composition at an analog inking station (120) by an analog printing method onto the coated substrate (130) while the radiation curable inkjet ink composition is still wet to form a hybrid coated substrate (150), and exposing the hybrid coated substrate (150) to curing radiation (e.g., electron beam radiation) at a curing station (160) to at least partially cure, preferably substantially cure, the radiation curable inkjet ink composition and the radiation curable analog ink composition.

Regardless of the application order, the coated substrate is preferably not cured, dried, and/or pinned prior to formation of the hybrid coated substrate. The time interval between applying the radiation curable analog ink composition and applying the radiation curable inkjet ink composition (or vice versa) is less than 10 s, preferably less than 5 s, more preferably less than 3 s, even more preferably less than 2 s, for example from 0.05 to 3 s, or from 1 to 2 s.

It should be noted that the applied radiation curable analog ink compositions and the applied radiation curable inkjet ink compositions can, but do not need to, coincide or completely overlap in the disclosed methods. For example, it may be advantageous to apply the radiation curable inks to different areas of the substrate, or to apply one ink so as to cover a greater surface area of the substrate than the other ink, so long as at least a portion of the applied inks overlap in a wet state in the hybrid coated substrate. Both analog and digital printing methods can be adjusted to provide low or high surface area coverages. However, in preferred embodiments, the analog printing method is used to provide high surface area coverage while the digital printing method is used to provide low surface area coverage. Further, while both the analog ink and the inkjet ink can be formulated to achieve various levels of gloss, in preferred embodiments, the analog printing method produces low to medium gloss images and the digital printing method produces high gloss images.

In embodiments where the image is to be viewed from the front (i.e., where the image is located in between the substrate and the point of view), the method preferably involves applying a radiation curable analog ink composition by an analog printing method onto a surface of the substrate to form a coated substrate with a high surface area coverage, then applying a radiation curable inkjet ink composition by a digital printing method with a low surface area coverage onto the coated substrate while the radiation curable analog ink composition is still wet to form a hybrid coated substrate. In alternative embodiments where the image is to be viewed from the back (i.e., where the substrate is located in between the image and the point of view), for example when the image is printed on the outside of a transparent bottle and is viewed through the inside of the transparent bottle, the method preferably involves applying a radiation curable inkjet ink composition by a digital printing method onto a surface of the substrate to form a coated substrate with a low surface area coverage, then applying a radiation curable analog ink composition by an analog printing method with a high surface area coverage onto the coated substrate while the radiation curable inkjet ink composition is still wet to form a hybrid coated substrate.

In preferred embodiments, the method described herein is performed on a printing line, whereby the substrate moves through various (in-line) inking and curing stations to produce the final image. Any currently constructed printing line may be easily adapted to perform the methods described herein, for example, by simply adding an analog inking station before a digital inking station, or vice versa, upstream of an in-line curing station.

In preferred embodiments, the radiation curable analog ink composition and the radiation curable inkjet ink compositions are compatible in a wet state. That is, prior to curing, the overlapping or superposed ink compositions on the hybrid coated substrate are compatible at the interface between the layers and thus do not bleed, mix, or diffuse into one another or bead up, reticulate and exhibit flow defects to a degree that affects the image quality after the hybrid coated substrate is cured. Such compatibility may be observed visually in the wet state and/or through instrumentation like PIAS-II (Personal Image Analysis System-II, made by Quality Engineering Associates, Billerica, MA) which displays print quality.

This compatibility in the wet state may be achieved through selection of raw materials and adjustment of the relative surface tensions of the first and second inks, for example, by applying an ink with higher surface tension first and then an ink with lower surface tension. When the sequence is reversed and an ink with lower surface tension is printed first followed by an ink with higher surface tension, the print quality is generally poor due to incompatibility and beading up of the ink with higher surface tension on the surface of the first ink.

Therefore, in embodiments where the method involves applying a radiation curable analog ink composition onto a surface of a substrate, followed by application of a radiation curable inkjet ink composition, the radiation curable inkjet ink composition preferably has a surface tension that is lower than a surface tension of the radiation curable analog ink composition. In most preferred embodiments, the radiation curable inkjet ink composition has a surface tension that is at least 1.5 mN/m, preferably at least 2 mN/m, preferably at least 5 mN/m, preferably at least 10 mN/m lower than a surface tension of the radiation curable analog ink composition.

Alternatively, in embodiments where the method involves applying a radiation curable inkjet ink composition onto a surface of a substrate, followed by application of a radiation curable analog ink composition, the radiation curable inkjet ink composition preferably has a surface tension that is higher than a surface tension of the radiation curable analog ink composition. In most preferred embodiments, the radiation curable inkjet ink composition has a surface tension that is at least 1.5 mN/m, preferably at least 2 mN/m, preferably at least 5 mN/m, preferably at least 10 mN/m higher than a surface tension of the radiation curable analog ink composition.

Substrate

The substrate may be a three dimensional part as well as flat sheets or webs that are supplied in roll form, and may form printed articles suitable for graphic arts, textiles, packaging, lottery, business forms and publishing industries, examples of which include a tag or label, a lottery ticket, a publication, packaging (e.g., flexible packaging), a folding carton, a rigid container (e.g., a plastic cup or tub, glass containers, metal cans, bottles, jars, and tubes), a point-of-sale display, and the like.

Both porous and non-porous substrates can be used in the disclosed methods. Examples of porous substrates include, but are not limited to, paper, wood, membranes, and fabrics (including, for example, but not limited to, woven fabric, non-woven fabric, and foil-laminated fabric). Non-porous substrates may include various plastics, glass, metals, and/or coated papers, such as molded plastic parts, as well a flat sheets or rolls of plastic films. Examples include those containing polyethylene terephthalate (PET), biaxially oriented polystyrene (OPS), polyethylene (PE), polypropylene (PP), oriented polypropylene (OPP), polylactic acid (PLA), oriented nylon, polyvinyl chloride (PVC), polyester, cellulose triacetate (TAC), polycarbonate, polyolefin, acrylonitrile butadiene styrene (ABS), polyacetal and polyvinyl alcohol (PVA), and the like. In preferred embodiments, the substrate is a plastic substrate. The methods disclosed herein may be used for printing packaging (e.g., flexible packaging), preferably food/product packaging (e.g., primary, secondary, or tertiary food packaging) which may contain food products, non-food products, pharmaceutical, and/or personal care items, which is enabled by the low migration (less than 10 ppb) of the cured ink composition into the packaged product/item.

The substrate may have a flat surface, a structured surface (e.g., a grained surface with a high surface roughness), and a three-dimensional surface, such as curved and/or complex surfaces.

Analog Printing Method

Analog printing methods are those printing methods that use an image transfer system, i.e., a method that transfers ink from a surface, usually a cylinder, bearing a fixed image to a substrate in contact with the surface. Examples of these analog printing methods include, but are not limited to, gravure, flexographic, offset, and screen printing. While not limited to a particular type of analog printing method, the present method preferably utilizes gravure or flexographic printing methods, more preferably flexographic printing methods for application of the radiation curable analog ink compositions. The analog printing method used herein enables high printing speeds, for example printing speeds of 30 to 80 m/min, preferably 40 to 75 m/min, more preferably 50 to 70 m/min, at low cost.

In gravure printing, a copper or ceramic plated ink fountain cylinder is engraved to form an image in intaglio. The intaglio image is defined by cells or wells etched into the cylinder surface. Each cell is sized to contain a predetermined amount of ink. Ink is supplied to the cells by an ink fountain. As the cylinder rotates, the cells are flooded with ink and the surface between cells is wiped clean by a doctor blade. Ink is discharged from each cell and transferred to the smooth surface of an elastomeric blanket secured to a transfer cylinder. The blanket contacts a moving substrate such as a polyethelene film so as to transfer the inked image to the substrate. Gravure methods and machines are well known to those of ordinary skill in the art and can be used in the methods described herein, for example, those described in U.S. Pat. Nos. 4,373,443, 4,072,103 and 6,866,715, each incorporated herein by reference in its entirety.

Flexography employs a resilient printing plate having raised portions, which are coated with an ink and pressed against a substrate to transfer the ink to the substrate. In flexography, ink is transferred from a reservoir to the printing plate's raised surface through an intermediate transfer roll known in the art as an anilox roll. The anilox roll surface is covered by a plurality of tiny ink wells that fill with ink from the reservoir and transfer the ink to the flexographic printing plate. In general, high quality printing can be achieved by inking the flexographic printing plate surface uniformly and consistently, which in turn can be achieved when the anilox roll cells are sufficiently small and by filling the anilox roll cells each time with ink from the reservoir to substantially the same level. Further, a doctor blade can be used for cleaning and removing excess ink applied over the anilox rolls in such a way as to leave the ink only inside of the anilox roll cells. Flexography methods and machines are well known to those of ordinary skill in the art and can be used in the methods described herein, for example, those described in U.S. Pat. Nos. 9,404,000, 7,047,878, and 6,866,715, each incorporated herein by reference in its entirety.

The radiation curable analog ink composition may be applied to the substrate or the coated substrate at an analog inking station in a single-pass (e.g., one coating) or in a multi-pass method to apply two or more coatings (e.g., two, three, four, etc.).

The film thickness of the analog ink can be metered to produce the desired effect by changing the ink applicator, such as the anilox roll. The thickness may also be varied according to the nature and thickness of the substrate.

Digital Printing Method

With inkjet printing, a desired printed image is formed when a precise pattern of dots is ejected from a drop-generating device, known as an inkjet printhead, onto a print medium. The printhead has an array of precisely formed nozzles located on a nozzle plate and attached to an inkjet printhead substrate.

Any printhead known to those of ordinary skill in the art of inkjet printing can be used as printing units in the digital printing method disclosed herein, including continuous printheads, thermal printheads, piezoelectric printheads, and acoustic printheads. Preferably, a drop on demand piezoelectric printhead is used. Typical parameters, such as drop speed, printhead temperature, control voltage and control pulse width, can be adjusted according to the specification of the printhead. Printheads which are generally suitable for usage in the methods herein have a droplet size in the range of 1 to 80 pL, preferably 2 to 48 pL, more preferably 7 to 42 pL, and a droplet frequency in the range of 10 to 100 kHz, although values above or below these ranges may also be used. In some embodiments, the digital printing method prints at speeds of about 1 to 300 m/min. preferably about 10 to 150 mi/min, and the radiation curable inkjet ink compositions are jetted at temperatures of less than about 100° C., such as from about 25° C. to about 100° C.

The radiation curable inkjet ink composition may be applied to the substrate or the coated substrate at an inkjet inking station in a single-pass (e.g., one coating) or in a multi-pass method to apply two or more coatings (e.g., two, three, four, etc.). A variety of inkjet printheads can be used.

Curing

Once all radiation curable inks have been applied to form a hybrid coated substrate, a single curing step is performed to at least partially cure, preferably substantially cure all applied inks. To accomplish this, the hybrid coated substrate is exposed to actinic radiation (e.g., UV radiation) and/or electron beam radiation, preferably electron beam radiation, resulting in at least partial curing of the radiation curable inks, preferably substantial curing.

In electron beam curing methods, electrons emerge from a vacuum chamber through a metal foil and reach the radiation curable inks on the hybrid coated substrate in a reaction chamber. Electron beam curing processes typically generate little heat and thus help prevent substrate distortion from thermal processing or processes requiring raised temperatures. The radiation curable inks may be exposed to electron beams using any electron beam generator, such as electron beam generators available from Electron Crosslinking AB (Sweden), ebeam Technologies (Switzerland) or Energy Sciences, Inc. (ESI) (USA). The electron beam generator may be arranged in combination with the printheads of the inkjet printers, or in-line with and in close proximity to either the inkjet inking station or the analog inking station so that the radiation curable inks (i.e., the hybrid coated substrate) are exposed to curing radiation shortly after being applied. For example, the time interval between the last application of ink (i.e., either the radiation curable analog ink composition or the radiation curable inkjet ink composition) and exposing the hybrid coated substrate to curing radiation is less than 5 s, preferably less than 3 s, more preferably less than 1 s.

In some embodiments, the radiation curable inks are exposed to a low dose of electron beam radiation to form an image, such as from about 0.1 Mrad, preferably from about 0.2 Mrad, preferably from about 0.3 Mrad, preferably from about 0.4 Mrad, preferably from about 0.5 Mrad, and up to about 1.3 Mrad, preferably up to about 1.2 Mrad, preferably up to about 1.1 Mrad, or more preferably up to about 1.0 Mrad. In some embodiments, an image is formed by exposing the radiation curable inks to a higher dose of electron beam radiation, for example, from about 1 Mrad, preferably from about 1.2 Mrad, preferably from about 1.5 Mrad, preferably from about 1.6 Mrad, preferably from about 1.7 Mrad, up to about 10 Mrad, preferably up to about 8 Mrad, preferably up to about 6 Mrad, or more preferably up to about 3 Mrad. The dose of electron beam radiation can be adjusted based on the dimensions and surface characteristics of the substrate and/or the desired level of curing, for example by reducing or increasing the dosage and exposure time. In general, such doses described above are capable of curing the at least two layers of ink present on the hybrid coated substrate.

Various electron beam accelerating potentials may be employed in the methods disclosed herein, however, an accelerating potential of less than 300 kV is typically used, preferably less than 260 kV, more preferably less than 240 kV, more preferably less than 220 kV, for example in the range of about 70 to about 200 kV.

Preferably, the cure speed of the hybrid coated substrate is within a range of from 20 m/min, preferably from 30 m/min, more preferably from 40 m/min, and up to 300 m/min, preferably up to 150 m/min, more preferably up to 100 m/min.

Optional Steps

The method of the present disclosure may optionally include supplying an inert gas during electron beam curing to displace oxygen ("inerting") which inhibits free-radical polymerization. In some embodiments, less than about 200 ppm, preferably less than about 180 ppm, preferably less than about 160 ppm, preferably less than about 140 ppm oxygen is present in the reaction chamber during curing. Any suitable inert gas may be used including, but not limited to, nitrogen gas and argon gas.

Further, it is noted that a drying step after application of the radiation curable inks is optional in the disclosed methods as the radiation curable inks of the present disclosure are preferably non-aqueous. When the methods involve a drying step, either of the applied radiation curable inks may be dried for about 10 seconds or less, preferably about 7 seconds or less, more preferably about 4 seconds or less, even more preferably about 2 seconds or less, yet even more preferably about 1 second or less, under ambient conditions, prior to exposing to curing radiation (e.g., electron beam radiation). In a preferred embodiment, the method does not include a drying step, other than the amount of time it takes to deliver the substrate from one inking station to another, or from a final inking station to the curing station (e.g., the electron beam generator).

It should also be recognized that substrate surface treatments such as corona treatment, atmospheric plasma treatment, and flame treatment may optionally be employed in the methods herein prior to application of the radiation curable inks to improve printed article characteristics, for example ink adhesion. These surface treatment processes may take place in-line (i.e., during the production run) or off-line (i.e., the substrate is surface treated prior to the production run, for example during the manufacturing of the substrate at a separate facility). The parameters of such substrate surface treatments may be varied greatly depending on the substrate material to be printed, the specific radiation curable inks utilized, the printing method applied, and the desired properties and applications of the printed article.

Radiation Curable Inks

The radiation curable inks (i.e., analog and inkjet inks) disclosed herein are compatible in the wet state, making them suitable for use in the disclosed hybrid wet on wet printing process, while also possessing suitable physical stability, chemical stability, and low volatility at both ambient temperatures and print head operating temperatures (i.e., in the case of inkjet ink compositions), and after curing, provide advantageous adhesion properties, rub and scratch resistance, and low migration tendencies.

Radiation Curable Analog Ink Compositions

Radiation curable analog ink compositions of the present disclosure generally include the following components: one or more ethylenically unsaturated oligomers, one or more ethylenically unsaturated monomers, and optionally include one or more of a surfactant, a colorant, a stabilizer, a gloss and viscosity control additive, an optical brightening agent, and a security taggant.

The ethylenically unsaturated oligomer may be present in the radiation curable analog ink composition in an amount of at least about 20 wt. %, preferably at least about 22 wt. %, preferably at least about 24 wt. %, preferably at least about 28 wt. %, more preferably at least about 30 wt. %, even more preferably at least about 34 wt. %, even more preferably at least about 36 wt. %, yet even more preferably at least about 38 wt. %, and up to about 50 wt. %, preferably up to about 48 wt. %, preferably up to about 44 wt. %, more preferably up to about 42 wt. %, even more preferably up to about 40 wt. %, or in a range of 36 to 42 wt. %, preferably 37 to 41 wt. %, more preferably 38 to 40 wt. % based on a total weight of the radiation curable analog ink composition.

The ethylenically unsaturated monomer may be present in the radiation curable analog ink composition in an amount of at least about 30 wt. %, preferably at least about 35 wt. %, preferably at least about 40 wt. %, preferably at least about 45 wt. %, more preferably at least about 48 wt. %, even more preferably at least about 50 wt. %, even more preferably at least about 52 wt. %, yet even more preferably at least about 53 wt. %, and up to about 65 wt. %, preferably up to about 63 wt. %, preferably up to about 61 wt. %, more preferably up to about 60 wt. %, even more preferably up to about 59 wt. %, yet even more preferably up to about 58, or in a range of 40 to 60 wt. %, preferably 45 to 58 wt. %, more preferably 54 to 56 wt. % based on a total weight of the radiation curable analog ink composition.

The proportions of the ethylenically unsaturated oligomer and the ethylenically unsaturated monomer described above can be controlled to obtain desirable properties, specifically radiation curable analog ink compositions that are compatible with the radiation curable inkjet ink compositions in the wet state (e.g., controlled to obtain desirable relative surface tensions), thus resulting in clear, high resolution images.

Surfactants may be employed in an amount of about 0 wt. %, preferably from about 0.001 wt. %, more preferably from about 0.005 wt. %, even more preferably from 0.1 wt. %, and up to about 10 wt. %, preferably up to 5 wt. %, preferably up to about 4 wt. %, more preferably up to about 3 wt. %, even more preferably up to about 2 wt. %, based on the total weight of the radiation curable analog ink composition.

In some embodiments, the radiation curable analog ink compositions are substantially free of colorants, wherein a colorless coating composition is formed that may be useful in clear-coating applications. All of the disclosure set forth herein relating to the radiation curable analog ink composition, other than the colorant descriptions, is equally applicable to such colorless coating compositions. The radiation curable analog ink composition may optionally contain a colorant which may comprise pigment, dye, or a combination of pigments and/or dyes to provide the desired color. In general, the colorants may be employed in amounts of up to about 25 wt. %, preferably up to about 20 wt. %, preferably up to about 10 wt. %, preferably up to about 8 wt. %, preferably up to about 5 wt. %, preferably up to about 3 wt. %, preferably up to about 2 wt. %, preferably up to about 1 wt. %, preferably up to about 0.1 wt. %, relative to the total weight of the radiation curable analog ink composition. Any desired or effective colorant can be employed, including dyes, pigments, mixtures thereof, and the like, provided that the colorant can be dissolved or dispersed in the ink compositions. Pigments, which are typically more robust than dyes, may be included in some embodiments. The colorants can be used in combination with conventional ink-colorant materials such as solvent dyes, disperse dyes, modified acid and direct dyes, basic dyes, sulfur dyes, vat dyes, and the like.

The radiation curable analog ink composition of the present disclosure may also optionally include a stabilizer to aid aerobic and/or anaerobic stability. The stabilizers can be present in an amount of about 0 to about 10 wt. %, preferably from about 0.001 wt. %, preferably from about 0.01 wt. %, more preferably from about 0.1 wt. %, and even more preferably from about 0.5 wt. %, and up to about 10 wt. %, preferably up to about 5 wt. %, preferably up to about 3 wt. %, more preferably up to about 2 wt. %, even more preferably up to about 1 wt. %, based on the total weight of the radiation curable analog ink composition.

A gloss and viscosity control additive may also optionally be included in the radiation curable analog ink composition as a way to adjust the viscosity and gloss. When present, the gloss and viscosity control additive may be employed in amounts of up to about 10 wt. %, preferably up to about 5 wt. %, preferably up to about 3 wt. %, more preferably up to about 2 wt. %, even more preferably up to about 1 wt. %, yet even more preferably up to about 0.3 wt. %, based on the total weight of the radiation curable analog ink composition.

An optical brightening agent may also be optionally included in the radiation curable analog ink compositions. Optical brightening agents may be used when printing on fibers, molded articles, films and sheets to provide the inks with whitening/brightening properties. The optical brightening agents useful in the methods herein are preferably resistant to heat, provide good light fastness, and have a low volatility. The optical brightening agent can be present in an amount of about 0 to about 5 wt. %, preferably from about 0.001 wt. %, preferably from about 0.01 wt. %, more preferably from about 0.1 wt. %, and even more preferably from about 0.2 wt. %, and up to about 5 wt. %, preferably up to about 1 wt. %, preferably up to about 0.6 wt. %, more preferably up to about 0.5 wt. %, based on the total weight of the radiation curable analog ink composition.

When used, the security taggants are generally incorporated at a loading of up to about 10 wt. %, preferably up to about 5 wt. %, preferably up to about 3 wt. %, preferably up to about 2 wt. %, preferably up to about 1 wt. %, preferably up to about 0.5 wt. %, relative to the total weight of the radiation curable analog ink compositions. Although the amount of the security taggant is generally within this range, the amount of security taggant can be varied outside of these ranges depending on the mode of detection, for example more security taggant may be required for easy detection by the naked eye. On the other hand, if detection is done via a machine read then lower loadings may be used.

In preferred embodiments, the radiation curable analog ink composition is substantially free of a photoinitiator, more preferably is completely free of a photoinitiator (e.g., 0 wt. %). Optionally, a photoinitiator may be present in radiation curable analog ink composition. The photoinitiator may be a cationic photoinitiator. The photoinitiator may also be a free-radical photoinitiator. When present, the radiation curable analog ink composition may contain less than about 3 wt. %, preferably less than about 2 wt. %, preferably less than about 1 wt. %, preferably less than about 0.5 wt. % of the photoinitiator(s).

In some embodiments, the radiation curable analog ink compositions of the invention may optionally include, or may be substantially free of non-reactive oligomers and/or polymers (i.e., oligomers or polymers which do not contain ethylenically unsaturated radiation curable functional groups), preferably non-reactive oligomers and/or polymers having a number average molecular weight of more than about 10,000 g/mol.

In preferred embodiments, the radiation curable analog ink composition includes 35 to 42 wt. % of a poly-ethylenically unsaturated oligomer (e.g., EBECYRL 1290), 50 to 60 wt. % of a poly-ethylenically unsaturated monomer, which is a 1.5:1 to 1:1.5 mixture of poly-ethylenically unsaturated monomers (e.g., Miramer M200 and Miramer M300), and 3 to 7 wt. % of a gloss and viscosity control additive (e.g., ACEMATT OK-412), each relative to the total weight of the radiation curable analog ink composition.

In preferred embodiments, the radiation curable analog ink composition includes 35 to 42 wt. % of a poly-ethylenically unsaturated oligomer (e.g., EBECYRL 1290), 50 to 60 wt. % of a poly-ethylenically unsaturated monomer, which is a 1.5:1 to 1:1.5 mixture of poly-ethylenically unsaturated monomers (e.g., Miramer M200 and Miramer M300), 0 to 5 wt. % of a surfactant (e.g., Byk-UV 3500), and 3 to 7 wt. % of a gloss and viscosity control additive (e.g., ACEMATT OK-412), each relative to the total weight of the radiation curable analog ink composition.

In preferred embodiments, the radiation curable analog ink composition includes 35 to 42 wt. % of a poly-ethylenically unsaturated oligomer (e.g., EBECYRL 1290), 50 to 60 wt. % of a poly-ethylenically unsaturated monomer, which is a 1.5:1 to 1:1.5 mixture of poly-ethylenically unsaturated monomers (e.g., Miramer M200 and Miramer M300), 0 to 2 wt. % of a surfactant (e.g., Byk-UV 3500), and 3 to 7 wt. % of a gloss and viscosity control additive (e.g., ACEMATT OK-412), each relative to the total weight of the radiation curable analog ink composition.

In some embodiments, the radiation curable analog ink compositions exhibit a desirable low to medium viscosity in liquid form i.e., they have a viscosity at 25° C. of from about 50 cPs, preferably from about 100 cPs, more preferably from about 150 cPs, even more preferably from about 200 cPs, yet even more preferably from about 250 cPs, and not greater than about 2,000 cPs, preferably not greater than about 1,500 cPs, more preferably not greater than about 1,000 cPs, even more preferably not greater than about 750 cPs, yet even more preferably not greater than about 600 cPs, yet even more preferably not greater than about 550 cPs.

The surface tension of the radiation curable analog ink composition may be adjusted depending on the order in which the radiation curable analog ink composition is applied in the hybrid wet on wet methods described herein. For example, it is desirable to formulate the radiation curable analog ink composition to have a high surface tension when it is to be applied first (i.e., prior to the radiation curable inkjet ink composition). In this way, a larger number of radiation curable inkjet ink compositions will be available for application onto the coated substrate that satisfy the lower surface tension condition, resulting in methods with maximum flexibility/freedom of selection. Conversely, when the radiation curable analog ink composition is to be applied second (i.e., after the radiation curable inkjet ink composition), the surface tension of radiation curable analog ink composition may be adjusted to be lower than that of the radiation curable inkjet ink composition onto which it is applied. The radiation curable analog ink compositions typically have a surface tension of at least about 20 mN/m, preferably at least about 25 mN/m, more preferably at least about 30 mN/m, and up to about 50 mN/m, preferably up to about 45 mN/i, more preferably up to about 40 mN/m at a temperature of about 25° C.

Radiation Curable Inkjet Ink Compositions

Radiation curable inkjet ink compositions of the present disclosure generally include the following components: an ethylenically unsaturated oligomer, an ethylenically unsaturated monomer, and optionally include one or more of a surfactant, a colorant, a stabilizer, an optical brightening agent, and a security taggant.

The ethylenically unsaturated oligomer may be present in the radiation curable inkjet ink composition in an amount of at least about 2 wt. %, preferably at least about 5 wt. %, preferably at least about 8 wt. %, preferably at least about 11 wt. %, preferably at least about 12 wt. %, more preferably at least about 13 wt. %, even more preferably at least about 14 wt. %, even more preferably at least about 15 wt. %, yet even more preferably at least about 16 wt. %, and up to about 30 wt. %, preferably up to about 28 wt. %, preferably up to about 26 wt. %, more preferably up to about 24 wt. %, even more preferably up to about 22 wt. %, or in a range of 2 to 24 wt. %, preferably 5 to 23 wt. %, more preferably 8 to 22 wt. % based on a total weight of the radiation curable inkjet ink composition.

The ethylenically unsaturated monomer may be present in the radiation curable inkjet ink composition in an amount of at least about 30 wt. %, preferably at least about 35 wt. %, preferably at least about 40 wt. %, preferably at least about 42 wt. %, more preferably at least about 44 wt. %, even more preferably at least about 45 wt. %, even more preferably at least about 46 wt. %, yet even more preferably at least about 47 wt. %, and up to about 85 wt. %, preferably up to about 80 wt. %, preferably up to about 75 wt. %, more preferably up to about 70 wt. %, even more preferably up to about 65 wt. %, yet even more preferably up to about 60, or in a range of 40 to 80 wt. %, preferably 45 to 78 wt. %, more preferably 50 to 74 wt. % based on a total weight of the radiation curable inkjet ink composition.

The proportions of the ethylenically unsaturated oligomer and the ethylenically unsaturated monomer described above can be controlled to obtain desirable properties, specifically radiation curable inkjet ink compositions that are compatible with the radiation curable analog ink compositions in the wet state, thus resulting in clear, high resolution images.

Surfactants may be employed in an amount of about 0 wt. %, preferably from about 0.001 wt. %, more preferably from about 0.005 wt. %, even more preferably from 0.1 wt. %, and up to about 10 wt. %, preferably up to 5 wt./%, preferably up to about 4 wt. %, more preferably up to about 3 wt. %, even more preferably up to about 2 wt. %, based on the total weight of the radiation curable inkjet ink composition.

In some embodiments, the radiation curable inkjet ink compositions are substantially free of colorants, wherein a colorless coating composition is formed that may be useful in clear-coating applications. All of the disclosure set forth herein relating to the radiation curable inkjet ink composition, other than the colorant descriptions, is equally applicable to such colorless coating compositions. The radiation curable inkjet ink composition may optionally contain a colorant which may comprise pigment, dye, or a combination of pigments and/or dyes to provide the desired color. In general, the colorants may be employed in amounts of up to about 25 wt. %, preferably up to about 20 wt. %, preferably up to about 10 wt. %, preferably up to about 8 wt. %, preferably up to about 5 wt. %, preferably up to about 3 wt. %, preferably up to about 2 wt. %, preferably up to about 1 wt. %, preferably up to about 0.1 wt. %, relative to the total weight of the radiation curable inkjet ink composition. Any desired or effective colorant can be employed, including dyes, pigments, mixtures thereof, and the like, provided that the colorant can be dissolved or dispersed in the ink compositions. Pigments, which are typically more robust than dyes, may be included in some embodiments. The colorants can be used in combination with conventional ink-colorant materials such as solvent dyes, disperse dyes, modified acid and direct dyes, basic dyes, sulfur dyes, vat dyes, and the like.

The radiation curable inkjet ink composition of the present disclosure may also optionally include a stabilizer to aid aerobic and/or anaerobic stability. The stabilizers can be present in an amount of about 0 to about 10 wt./%, preferably from about 0.001 wt. %, preferably from about 0.01 wt. %, more preferably from about 0.1 wt. %, and up to about 10 wt. %, preferably up to about 5 wt. %, preferably up to about 3 wt. %, more preferably up to about 2 wt. %, even more preferably up to about 1 wt. %, based on the total weight of the radiation curable inkjet ink composition.

An optical brightening agent may also be optionally included in the radiation curable inkjet ink compositions. Optical brightening agents may be used when printing on fibers, molded articles, films and sheets to provide the inks with whitening/brightening properties. The optical brightening agents useful in the methods herein are preferably resistant to heat, provide good light fastness, and have a low volatility. The optical brightening agent can be present in an amount of about 0 to about 5 wt. %, preferably from about 0.001 wt. %, preferably from about 0.01 wt. %, more preferably from about 0.1 wt. %, and even more preferably from about 0.2 wt. %, and up to about 5 wt. %, preferably up to about 1 wt. %, preferably up to about 0.6 wt. %, more preferably up to about 0.5 wt. %, based on the total weight of the radiation curable inkjet ink composition.

When used, the security taggants are generally incorporated at a loading of up to about 10 wt. %, preferably up to about 5 wt. %, preferably up to about 3 wt. %, preferably up to about 2 wt. %, preferably up to about 1 wt. %, preferably up to about 0.5 wt. %, relative to the total weight of the radiation curable inkjet ink compositions. Although the amount of the security taggant is generally within this range, the amount of security taggant can be varied outside of these ranges depending on the mode of detection, for example more security taggant may be required for easy detection by the naked eye. On the other hand, if detection is done via a machine read then lower loadings may be used. To be useful in the digital printing methods described herein, the security taggants preferably have a particle size of less than 10 μm, preferably less than 8 μm, preferably less than 6 μm, preferably less than 4 μm, preferably less than 2 μm, preferably less than 1 μm, or in a range of about 1 to 2 μm.

In preferred embodiments, the radiation curable inkjet ink composition is substantially free of a photoinitiator, more preferably is completely free of a photoinitiator (e.g., 0 wt. %). Optionally, a photoinitiator may be present in radiation curable inkjet ink composition. The photoinitiator may be a cationic photoinitiator. The photoinitiator may also be a free-radical photoinitiator. When present, the radiation curable inkjet ink composition may contain less than about 3 wt. %, preferably less than about 2 wt. %, preferably less than about 1 wt. %, preferably less than about 0.5 wt. % of the photoinitiator(s).

In some embodiments, the radiation curable inkjet ink compositions of the invention may optionally include, or may be substantially free of non-reactive oligomers and/or polymers (i.e., oligomers or polymers which do not contain ethylenically unsaturated radiation curable functional groups), preferably non-reactive oligomers and/or polymers having a number average molecular weight of more than about 10,000 g/mol.

In preferred embodiments, the radiation curable inkjet ink composition includes 20 to 24 wt. % of a poly-ethylenically unsaturated oligomer (e.g., CN2303), 70 to 75 wt. % of a poly-ethylenically unsaturated monomer, which is a 1.4:1 to 1.6:1 mixture of poly-ethylenically unsaturated monomers (e.g., SR9003B and Miramer M200), 0 to 5 wt. % of one or more surfactants (e.g., TEGO RAD 2300, EBECRYL 1360, Byk-377, etc.), 0.2 to 0.4 wt. % of one or more stabilizers (e.g., MeHQ, Irganox 1035, etc.), and 0.1 to 0.3 wt. % of an optical brightening agent (e.g. TINOPAL OB/UVITEX OB), each relative to the total weight of the radiation curable inkjet ink composition.

In preferred embodiments, the radiation curable inkjet ink composition includes 20 to 24 wt. % of a poly-ethylenically unsaturated oligomer (e.g., EBECRYL LEO 10551), 70 to 75 wt. % of an ethylenically unsaturated monomer, which is a 0.9:1 to 1.1:1 mixture of a poly-ethylenically unsaturated monomer (e.g., SR9003B) to a mono-ethylenically unsaturated monomer (e.g., SR420), 0 to 5 wt. % of one or more surfactants (e.g., TEGO RAD 2300, EBECRYL 1360, Byk-377, etc.), 0.01 to 0.1 wt. % of a stabilizer (e.g., MeHQ), and 0.1 to 0.3 wt. % of an optical brightening agent (e.g. TINOPAL OB/UVITEX OB), each relative to the total weight of the radiation curable inkjet ink composition.

In preferred embodiments, the radiation curable inkjet ink composition includes 12 to 16 wt. % of a poly-ethylenically unsaturated oligomer (e.g., EBECRYL LEO 10551), 50 to 54 wt. % of an ethylenically unsaturated monomer, which is a 0.9:1 to 1.1:1 mixture of a poly-ethylenically unsaturated monomer (e.g., SR9003B) to a mono-ethylenically unsaturated monomer (e.g., SR420), 0 to 5 wt. % of one or more surfactants (e.g., TEGO RAD 2300, EBECRYL 1360, Byk-377, etc.), 0.01 to 0.1 wt. % of a stabilizer (e.g., MeHQ), 0.1 to 0.3 wt. % of an optical brightening agent (e.g. TINOPAL OB/UVITEX OB), and 16 to 25 wt. % of a colorant, for example a pigment (e.g. Titanium dioxide), which may be part of a colorant dispersion, each relative to the total weight of the radiation curable inkjet ink composition.

In some embodiments, the radiation curable inkjet ink compositions exhibit a desirable low viscosity in liquid form, i.e., they have a viscosity at 25° C. of from about 1 cPs, preferably from about 2 cPs, more preferably from about 3 cPs, even more preferably from about 5 cPs, yet even more preferably from about 10 cPs, and not greater than about 50 cPs, preferably not greater than about 40 cPs, more preferably not greater than about 35 cPs, even more preferably not greater than about 30 cPs, yet even more preferably not greater than about 25 cPs, yet even more preferably not greater than about 20 cPs.

The surface tension of the radiation curable inkjet ink composition may be adjusted depending on the order in which it is applied in the hybrid methods described herein. For example, it is desirable to formulate the radiation curable inkjet ink composition to have a high surface tension when it is to be applied first (i.e., prior to the radiation curable analog ink composition). In this way, a larger number of radiation curable analog ink compositions will be available for application onto the coated substrate that satisfy the lower surface tension condition, resulting in methods with maximum flexibility/freedom of selection. Conversely, when the radiation curable inkjet ink composition is to be applied second (i.e., after the radiation curable analog ink composition), the surface tension of radiation curable inkjet ink composition may be adjusted to be lower than that of the radiation curable analog ink composition onto which it is applied. Typically, the radiation curable inkjet ink composition has a surface tension of at least about 20 mN/m, more preferably at least about 22 mN/m, and up to about 60 mN/m, preferably up to about 40 mN/m, more preferably up to about 30 mN/m at a temperature of about 25° C.

Ink Components

The various ink components listed below may be used, in appropriate amounts, in the radiation curable analog ink composition, the radiation curable inkjet ink composition, or both, unless specifically stated otherwise.

Ethylenically Unsaturated Oligomer

The ethylenically unsaturated oligomer may be a mono-ethylenically unsaturated oligomer, a poly-ethylenically unsaturated oligomer, or mixtures thereof. Mono-ethylenically unsaturated oligomers generally provide strong yet flexible cured films, high elongation, and chemical resistance. Poly-ethylenically unsaturated oligomers include two or more ethylenically unsaturated groups per molecule, for example di-, tri-, tetra-, penta-, hexa-, hepta-, and octa-ethylenically unsaturated oligomers and may be used in the radiation curable inks to offer fast curing, toughness, flexibility, abrasion resistance, exterior durability, resistance to yellowing, and other desirable properties to the cured ink compositions.

Both aliphatic and aromatic mono-ethylenically unsaturated oligomers may be employed in the radiation curable inks, for example, acrylates or methacrylates of straight chain, branched chain, or cyclic alkyl alcohols, and aromatic acrylic oligomers, including polyether alcohols thereof. Specific examples include aliphatic monoacrylate oligomers (e.g., CN152, CN130), aromatic monoacrylate oligomers (e.g., CN131), acrylic oligomers (e.g., CN2285) and the like, as well as mixtures thereof. In addition to acrylate or methacrylate groups, the mono-ethylenically unsaturated oligomers employed herein may also possess hydroxyl functionality, for example CN3100 and CN3105. All of the oligomers disclosed above are available from Sartomer Co. Inc. (Exton, Pa.), and may be used singly or in combination of two or more. In some embodiments, the mono-ethylenically unsaturated oligomer has a number average molecular weight of about 250 g/mol, preferably about 300 g/mol, more preferably about 350 g/mol, and up to about 50,000 g/mol, preferably up to about 30,000 g/mol, preferably up to about 10,000 g/mol, more preferably up to about 5,000 g/mol, even more preferably up to about 1,000 g/mol. The viscosity of the mono-ethylenically unsaturated oligomer is typically from about 50 cPs, preferably from about 70 cPs, more preferable from about 90 cPs, and up to about 1.200 cPs, preferably up to about 1,100 cPs, and more preferably up to about 1,000 cPs at 25° C., although viscosities outside of this range are possible and the mono-ethylenically unsaturated oligomers may still function as intended.

Preferably, the ethylenically unsaturated oligomer is a poly-ethylenically unsaturated oligomer. Poly-ethylenically unsaturated oligomers for use in the radiation curable inks include, for example, acrylates, (meth)acrylates, or vinyl ethers of straight chain, branched chain, hyperbranched or cyclic alkyl alcohols, including those that are silicone, polyester, or glycol-based acrylates, (meth)acrylates, or vinyl ethers of alcohols. In some embodiments, the poly-ethylenically unsaturated oligomers have a number average molecular weight of at least about 300 g/mol, preferably at least about 500 g/mol, more preferably at least about 800 g/mol, and up to about 50,000 g/mol, preferably up to about 30,000 g/mol, more preferably up to about 10,000 g/mol, even more preferably up to about 5,000 g/mol, yet even more preferably up to about 1,200 g/mol.

Exemplary poly-ethylenically unsaturated oligomers that may be employed herein include diacrylate oligomers (e.g., CN132, CN991, CN962, CN964, and CN966, Sartomer Co. Inc.), tetra-acrylate oligomers (e.g., CN549, Sartomer Co. Inc.), silicone hexa-acrylates (e.g., EBECRYL 1360, Allnex, Belgium), urethane acrylates (e.g., EBECYRL 1290, Allnex, Belgium), polyester acrylate oligomers (e.g., CN2302 and CN2303, Sartomer Co. Inc.), polyether acrylate oligomers (e.g., EBECRYL LEO 10551, Allnex, Belgium), polyester acrylate/polyether acrylate blends (e.g., BDE1025, Dymax Corp.), polyester urethane-based oligomers (e.g., CN966J75, which is an aliphatic polyester based urethane diacrylate oligomer blended with 25 wt. % SR506, isobornyl acrylate, available from Sartomer Co. Inc.), aliphatic urethane oligomers (e.g., EBECRYL 8411, which is an aliphatic urethane diacrylate oligomer blended with 20 wt. % isobornyl acrylate, available from Allnex, Belgium, and CN9893, available from Sartomer Co. Inc.), aromatic urethane acrylates (e.g., EBECRYL 220, available from Allnex, Belgium), polyfunctional vinyl ether oligomers (e.g., VECTOMER 1312, Sigma Aldrich), and silicone di-acrylates (e.g., CN9800, available from Sartomer Co. Inc., and EBECRYL 350, available from Allnex, Belgium). These poly-ethylenically unsaturated oligomers may be used singly or in combination of two or more.

In preferred embodiments, the poly-ethylenically unsaturated oligomer is at least one selected from the group consisting of CN2303, which is a hyperbranched polyester acrylate oligomer designed with low viscosity and high functionality for a fast surface cure, EBECRYL 1290, and EBECRYL LEO 10551, which is a low viscosity amine modified polyether acrylate oligomer that provides good cure response, good flexibility, high gloss, low extractables, and low odor and migration after curing.

Ethylenically Unsaturated Monomer

The ethylenically unsaturated monomer component present in the radiation curable inks may be a mono-ethylenically unsaturated monomer, a poly-ethylenically unsaturated monomer, or mixtures thereof. Mono-ethylenically unsaturated monomers may increase the chain length of oligomers and build molecular weight, without excessive crosslinking, contributing to low modulus, high elongation, flexibility, desirable hardness properties, thermal resistance, low shrinkage, improved water resistance, resiliency, and impact resistance of the cured ink compositions. Poly-ethylenically unsaturated monomers include two or more ethylenically unsaturated groups per molecule, for example di-, tri-, tetra-, penta-, hexa-, hepta-, and octa-ethylenically unsaturated monomers, are typically liquids at a temperature of 25° C., and may provide advantageous crosslinking properties.

In some embodiments, the ethylenically unsaturated monomer is a poly-ethylenically unsaturated monomer. In preferred embodiments, a mixture of poly-ethylenically unsaturated monomers is used, for example in a weight ratio of 4:1 to 1:4, preferably a 3:1 to 1:3, more preferably 2:1 to 1:2, more preferably 1.5:1 to 1:1.5. In other preferred embodiments, a mixture of poly-ethylenically unsaturated monomers and mono-ethylenically unsaturated monomers is used in the radiation curable inks, for example in a weight ratio of 4:1 to 1:4, preferably a 3:1 to 1:3, more preferably 2:1 to 1:2, more preferably 1.5:1 to 1:1.5, or about 1:1.

The mono-ethylenically unsaturated monomer may be an acrylate ester monomer having hydroxyl functionality, an aliphatic or aromatic acrylate ester monomer, and/or a vinyl ether monomer.

Suitable acrylate ester monomers having hydroxyl functionality include hydroxyl functional monoacrylates, or their mono(meth)acrylates of straight chain, branched chain, or cyclic alkyl alcohols, including polyether alcohols. Examples of which include, but are not limited to, hydroxyalkylacrylates and hydroxyalkyl(meth)acrylates wherein the hydroxyalkyl group contains 1 to 12 carbon atoms, preferably 2 to 10 carbon atoms, preferably 3 to 8 carbon atoms. Examples include hydroxyethylacrylate, hydroxyethyl (meth)acrylate, hydroxypropylacrylate, hydroxypropyl (meth)acrylate, hydroxybutylacrylate, hydroxybutyl(meth) acrylate, 2-hydroxy-3-phenyloxypropylacrylate, 2-hydroxy-3-phenyloxypropyl(meth)acrylate, 1,4-butanediol monoacrylate, 1,4-butanediol mono(meth)acrylate, 4-hydroxycyclohexylacrylate, 4-hydroxycyclohexyl(meth)acrylate, 1,6-hexanediol monoacrylate, 1,6-hexanediol mono (meth)acrylate, 2-[(1',1',1'-trifluoro-2'-(trifluoromethyl)-2'- hydroxy)propyl]-3-norbornyl methacrylate, and any combination or subset thereof.

Aliphatic or aromatic acrylate ester monomers for use in the radiation curable inks include, for example, acrylates and (meth)acrylates of straight chain, branched chain, or cyclic alkyl alcohols, such as alcohols having 1-20 carbon atoms, preferably 4-16 carbon atoms, including polyether alcohols thereof, as well as acrylates or (meth)acrylates of aromatic, bicyclic or heterocyclic alcohols, optionally containing an aliphatic linking group between the acrylate and the aromatic group, bicycle or heterocycle. Exemplary aliphatic mono-ethylenically unsaturated monomers include 3,3,5-trimethylcyclohexyl acrylate (e.g., SR420), 3,3,5-trimethylcyclohexyl methacrylate (e.g., CD421), 3,5,5-trimethylhexyl acrylate, cyclohexyl methacrylate, phenyl methacrylate, 4-tert-butylcyclohexyl acrylate (Laromer TBCH), dicyclopentadienyl methacrylate (e.g., CD535), diethylene glycol methyl ether methacrylate (e.g., CD545), methoxy polyethylene glycol (550) monoacrylate monomer (CD553), alkoxylated tetrahydrofurfuryl acrylate (e.g., CD611), ethoxylated (4) nonyl phenol methacrylate (e.g., CD612), ethoxylated nonyl phenol acrylate (e.g., CD613), triethylene glycol ethyl ether methacrylate (e.g., CD730), monofunctional acid ester (e.g., CD9050), alkoxylated lauryl acrylate (e.g., CD9075), alkoxylated phenol acrylate (e.g., CD9087), tetrahydrofurfuryl methacrylate (e.g., SR203), isodecyl methacrylate (e.g., SR242), 2-(2-ethoxyethoxy) ethyl acrylate (e.g., SR256), stearyl acrylate (e.g., SR257), tetrahydrofurfuryl acrylate (e.g., SR285), lauryl methacrylate (e.g., SR313A), stearyl methacrylate (e.g., SR324), lauryl acrylate (e.g., SR335), 2-phenoxylethyl acrylate (e.g., SR339), 2-phenoxylethyl methacrylate (e.g., SR340), isodecyl acrylate (e.g., SR395), isobornyl methacrylate (e.g., SR423A), isooctyl acrylate (e.g., SR440), octadecyl acrylate (SR484), tridecyl acrylate (SR489D), tridecyl methacrylate (SR493), caprolactone acrylate (e.g., SR495), ethoxylated (4) nonylphenol acrylate (e.g., SR504), isobornyl acrylate (e.g., SR506A), cyclic trimethylolpropane formal acrylate (e.g., SR531), methoxy polyethylene glycol (350) monomethacrylate (e.g., SR550), and the like. These monomers may be used singly or in combination of two or more thereof. All of the monomers disclosed above are available from Sartomer Co. Inc. (Exton, Pa.), BASF Dispersions & Resins, North America. or Sigma Aldrich.

Vinyl ether monomers may include an aliphatic, aromatic, alkoxy, aryloxy monofunctional vinyl ether and vinyl ether alcohol. Suitable examples include vinyl ethers such as Rapi-cure HBVE, Rapi-cure CVE, Rapi-cure EHVE, all available from Ashland Specialty Company, 4-hydroxymethyl cyclohexylmethyl vinyl ether (Novachem), dodecylvinyl ether, and octadecylvinylether (BASF).

In preferred embodiments, the mono-ethylenically unsaturated monomer present in the radiation curable inks is preferably at least one selected from the group consisting of 4-tert-butylcyclohexyl acrylate, isobornyl acrylate, 3,3,5-trimethylcyclohexyl acrylate, and 2-phenoxylethyl acrylate, most preferably 3,3,5-trimethylcyclohexyl acrylate (e.g., SR420).

The viscosity of the mono-ethylenically unsaturated monomer is typically from about 2 cPs, preferably from about 3 cPs, more preferable from about 5 cPs, and up to about 300 cPs, preferably up to about 200 cPs, preferably up to about 150 cPs, preferably up to about 145 cPs, and more preferably up to about 140 cPs at 25° C., although viscosities outside of this range are possible and the mono-ethylenically unsaturated monomers may still function as intended.

Poly-ethylenically unsaturated monomer for use in the radiation curable inks include, for example, acrylates, (meth)acrylates, or vinyl ethers of straight chain, branched chain, hyperbranched or cyclic alkyl alcohols. Exemplary poly-ethylenically unsaturated monomers that may be employed herein include tripropyleneglycol diacrylate, neopentyl glycoldiacrylate (all available from Sartomer), Miramer M200 (HDDA, 1,6-hexanediol diacrylate, Rahn USA, also known as SR238 available from Sartomer Co. Inc.), Miramer M300 (TMPTA, trimethylolpropane triacrylate, Rahn USA), acrylates of propoxylated alcohols such as propoxylated (2) neopentyl glycol diacrylate (SR9003B, Sartomer Co. Inc.), acrylates of ethoxylated alcohols such as ethoxylated (6) trimethylolpropane triacrylate (e.g., SR499, Sartomer Co. Inc.), triethyleneglycol divinylether (e.g., Rapi-cure DVE 3), cyclohexanedimethanol divinylether, diethyleneglycol divinylether, hexanediol divinylether, butanediol divinylether (all available from Sigma Aldrich), bis[4-(ethenyloxy)butyl]hexanedioic acid ester (VECTOMER 4060), bis[4-(ethenyloxybutyl]ester of 1,3-benzenedicarboxylic acid (VECTOMER 4010), trifunctional vinyl ether monomers (e.g., tris(4-vinyloxybutyl) trimellitate, VECTOMER 5015), all available from Vertellus Performance Materials, Greensboro, NC Hybrid poly-ethylenically unsaturated monomers containing both acrylate and vinyl ether functionality may also be used, examples of which include, but are not limited to 2-(2-vinylethoxy)ethyl (meth)acrylate, 2-(2-vinyloxyethoxy)-2-propyl (meth)acrylate, 2-(2-vinyloxyethoxy)-3-propyl (meth)acrylate, 2-(2-vinyloxyethoxy)-2-butyl (meth)acrylate, 2-(2-vinyloxyethoxy) 4-butyl (meth)acrylate, 2-(2-allyloxyethoxy)ethyl (meth)acrylate, 2-(2-allyloxyethoxy)-2-propyl (meth)acrylate, 2-(2-allyloxyethoxyxy)-3-propyl (meth)acrylate, 2-(2-allyloxyethoxy)-2-butyl (meth)acrylate, 2-(2-allyloxyethoxy)-4-butyl (meth)acrylate, 2-(2-vinyloxypropoxy)ethyl (meth)acrylate, 2-(2-vinyloxypropoxy)-2-propyl (meth)acrylate, 2-(2-vinyloxypropoxy)-3-propyl (meth)acrylate, 2-(3-vinyloxypropoxy)ethyl (meth)acrylate, 2-(3-vinyloxypropoxy) 2-propyl (meth)acrylate, 2-(3-vinyloxypropoxy)-3-propyl(meth)acrylate, and any combinations or subset thereof. Any of the above poly-ethylenically unsaturated monomers may be used singly or in combination of two or more.

In a preferred embodiment, the poly-ethylenically unsaturated monomer used in the radiation curable inks is 1,6-hexanediol diacrylate (Miramer M200, Rahn USA), propoxylated (2) neopentyl glycol diacrylate (SR9003B, Sartomer Co. Inc.), or mixtures thereof.

Surfactant

A surfactant may optionally be used to lower the surface tension of the radiation curable inks to allow wetting and leveling of the substrate surface, if necessary, before curing. The surfactant can be selected by both its hydrophobic and hydrophilic properties. In some embodiments, the surfactants may be miscible with the radiation curable material (i.e., acrylate or methacrylate miscible). Surfactants suitable for use in the radiation curable inks include, but are not limited to, polysiloxanes, polyacrylic copolymers, fluorine containing polymers, and the like. These surfactants may include one or more functional group such as carbinol, alkyl, aryl, glycol, polyether, siloxane, and mixtures thereof. In some embodiments, these materials contain reactive groups that allow them to become part of the cured network. In cases where the material contains functional groups that allow it to be classified as either a reactive component (e.g., poly-ethylenically unsaturated component) or a surfactant, for example in the case of EBECRYL 1360, the amount of the material used will dictate whether it is defined as a reactive component or as a surfactant. Suitable surfactants may include, but are not limited to polydimethylsiloxane copolymer (Siltech C-20, C-42, C-468), alkyl and aryl modified polydimethylsiloxane (Siltech C-32), silicone polyether (Siltech C-101, 442), block copolymer of dimethylsiloxane and a polyoxyalkylene (Siltech C-241, available from Siltech Corporation); RAD 2100, RAD 2200, RAD 2250, RAD 2300, RAD 2500. RAD 2600, and RAD 2700, glide 410, glide 435, glide 440, glide 450, flow 300, flow 425, flow ZFS 460, wet 250, disperse 610, disperse 710, commercially available from Evonik Industries AG, all TEGO products: CoatOSil 1211, CoatOSil 1301, CoatOSil 3500, CoatOSil 3503, CoatOSil 3509, and CoatOSil 3573 commercially available from Momentive; Byk-306, Byk-381, Byk-333, Byk-377, Byk-UV 35(0, Byk-UV 3510, and Byk-UV 3530, Disperbyk 108, anti-terra 204, commercially available from Byk Chemie; FC-4430 and FC-4432 commercially available from 3M Corporation: silicone acrylates (e.g., silicone hexaacrylates) such as EBECRYL 1360, commercially available from Allnex, Belgium; Dow Corning 67 additive, commercially available from Dow; SR 492, SR 9003, commercially available from Sartomer Co. Inc. and the like, and mixtures thereof. Preferably, the surfactant is at least one of BYK UV 3500, RAD 2300, EBECRYL 1360, and Byk-377, more preferably a mixture thereof. RAD 2300 is advantageously employed as a surfactant (substrate wetting, flow, and slip additive) in the disclosed radiation curable inks, and provides mechanical resistance, substrate wetting, and low migration owing to its low foaming and crosslinkable properties.

Colorants

It is to be readily appreciated by those of ordinary skill in the art that colorants may be included in the radiation curable inks to provide colored inks that may be used for a variety of printing purposes and the radiation curable inkjet ink compositions are not limited to any particular color. Suitable colors include, for example, cyan, magenta, yellow, and key (black) ("CMYK"), white, orange, red, blue, green, light cyan, light magenta, light yellow, violet, and the like, including both spot colors and process colors. Examples of suitable dyes include Neozapon Red 492 (Pylam Products Co., Inc.); Orasol Red G (BASF); Direct Brilliant Pink B (Zibo Hongwei Industry Co.); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Orasol Black CN (BASF): Savinyl Black RLSN (Clariant); Pyrazol Black BG (Clariant); Morfast Black 101 (Keystone); Orasol Blue GN (BASF); Savinyl Blue GLS (Clariant); Luxol Fast Blue MBSN (ACROS); Sevron Blue 5GMF (Classic Dyestuffs): Basacid Blue 750 (BASF), Neozapon BlackX51 (BASF), Classic Solvent Black 7 (Classic Dyestuffs), Sudan Blue 670 (C.I. 61554) (BASF), Sudan Yellow 146 (C.I. 12700) (BASF), SudanRed462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, which is incorporated herein by reference in its entirety, and the like. Polymeric dyes can also be used, such as those disclosed in, for example, U.S. Pat. Nos. 5,621,022 and 5,231,135, which are each incorporated herein by reference in its entirety, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, which are each incorporated herein by reference in their entirety.

Pigments are also suitable colorants for the radiation curable inks. Exemplary pigments include those having the following Color Index classifications: Green PG 7 and 36; Orange PO 5, 34, 36, 38, 43, 51, 60, 62, 64, 66.67 and 73; Red PRI 12, 122, 146, 149, 150, 170, 178, 179, 185, 187, 188, 207, 208, 214, 220, 224, 242, 251, 254, 255, 260 and 264; Magenta/Violet PV 19, 23, 31, and 37, and PR 122, 181 and 202: Yellow PY 12, 13, 17, 120, 138, 139, 155, 151, 168, 175, 179, 180, 181 and 185; Blue PB 15, 15:3, 15:4, 15:6; Black PB 2, 5 and 7; carbon black; White: titanium dioxide (including rutile and anatase): zinc sulfide, and the like. Examples of suitable pigments include PALIOGEN Violet 5100 (commercially available from BASF); PALIOGEN Violet 5890 (commercially available from BASF); HELIOGEN Green L8730 (commercially available from BASF); Irgalite Scarlet D3700 (commercially available from BASF); SUNFAST Blue 15:4 (commercially available from Sun Chemical): Hostaperm Blue B2G-D (commercially available from Clariant): Hostaperm Blue B4G (commercially available from Clariant): Permanent Red P-F7RK: Hostaperm Violet BL (commercially available from Clariant); LITHOL Scarlet 4440 (commercially available from BASF): Bon Red C (commercially available from Dominion Color Company); PALIOGEN Red 3871 K (commercially available from BASF): SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO 1 (commercially available from Clariant); IRGALITE Blue BCA, GLSM, or GLVO (commercially available from BASF); PALIOGEN Blue 6470 (commercially available from BASF); MONASTRAL BLUE FGX, GBX, GLX, a 6Y, Sudan Orange G (commercially available from Aldrich). Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVO PERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco- Yellow L1250 (commercially available from BASF); Suco-Yellow D1355 (commercially available from BASF): Suco Fast Yellow DI 355, DI 351 (commercially available from BASF); HOSTAPERM Pink E 02 (commercially available from Clariant): Hansa Brilliant Yellow 5GX03 (commercially available from Clariant): Permanent Yellow GRL 02 (commercially available from Clariant); Permanent Rubine L6B 05 (commercially available from Clariant); FANAL Pink D4830 (commercially available from BASF); CINQUASIA Magenta (commercially available from BASF); PALIOGEN Black L0084 (commercially available from BASF); Pigment Black K801 (commercially available from BASF); and carbon blacks such as REGAL 330 (commercially available from Cabot), NIPEX 150, NIPEX 160, NIPEX 180 (commercially available from Orion Engineered Carbons). SPECIAL BLACK 100, SPECIAL BLACK 250, SPECIAL BLACK 350, FW1, FW2 FW200, FW18, SPECIAL BLACK 4, SPECIAL BLACK 5, SPECIAL BLACK 6, PRINTEX 80, PRINTEX 90, PRINTEX 140, PRINTEX 150T, PRINTEX 200, PRINTEX U. and PRINTEX V, all available from Orion Engineered Carbons, MOGUL L, REGAL 400R, REGAL 330, and MONARCH 900, available from Cabot Chemical Co., Boston, Mass., MA77, MA7, MA8, MA11, MA100, MAI00R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, Tokyo, Japan, RAVEN 2500 ULTRA, from Birla Carbon—Columbian, and the like, as well as mixtures thereof.

White pigments suitable for use in the radiation curable inks include pigment white 1 (lead hydroxide carbonate), pigment white 3 (Lead sulfate), pigment white 4 (zinc oxide), pigment white 5 (lithopone), pigment white 6 (titanium dioxide), pigment white 7 (zinc sulfide), pigment white 10 (barium carbonate), pigment white 11 (antimony trioxide), pigment white 12 (zirconium oxide), pigment white 14 (Bismuth oxychloride), pigment white 17 (bismuth subnitrate), pigment white 18 (calcium carbonate), pigment white 19 (kaolin), pigment white 21 (barium sulfate), pigment white 24 (aluminum hydroxide), pigment white 25 (calcium sulfate), pigment white 27 (silicon dioxide), pigment white 28 (calcium metasilicate), and pigment white 32 (zinc phosphate cement). In the case of titanium oxide pigments, nanostructured titania powders from Nanophase Technologies Corporation, Burr Ridge, Illinois, or under the trade names KRONOS 1171 from Kronos Titan, Cranbury, N.J may be used, including all crystalline forms such as anatase phase, rutile phase and brookite phase. Surface treated or surface coated titania, for example titania coated with silica, alumina, alumina-silica, boric acid, and zirconia, may also be used. This type of coated titanium oxide is commercially available from E.I. du Pont de Nemours and Company, Wilmington, Del., under the trade name TR52, R700, R706, R796, R900, R902, and R960. Preferably, the white pigment employed in the radiation curable inks has a refractive index greater than 1.6, preferably greater than 2.0, more preferably greater than 2.5, even more preferably greater than 2.6. A preferred white pigment is Sachtleben RDI-S made by Sachtleben Pigments, Finland.

The pigments generally are of a size that can be jetted from a print head without substantially clogging print nozzles, capillaries, or other components of print equipment. Pigment size can also have an effect on the final ink viscosity. The average particle size of the pigment is generally at least about 10 nm, preferably at least about 25 nm, more preferably at least about 50 nm, and less than about 750 nm, preferably less than about 500 nm, and more preferably less than about 350 nm. For example, the pigments can have a D50 of less than or equal to 350 nm.

Stabilizers

Examples of stabilizers include but are not limited to Irgastab UV 10, Irgastab UV 22, Irganox 1010, Irganox 1035, and Tinuvin 292 (available from BASF), Omnistab LS292 (available from IGM Resins, Shanghai, China), 4-methoxyphenol, HQ (hydroquinone), MeHQ (methylhydroquinone), BHT (butylated hydroxyl toluene) commercially available from Sigma-Aldrich Corp. Preferred stabilizers for use in the radiation curable inks include one or more of MeHQ (methylhydroquinone) and Irganox 1035, which is a sulfur-containing, primary (phenolic) antioxidant and heat stabilizer with the formula thiodiethylene bis(3,5-di-tert-butyl)-4-hydroxyhydrocinnamate.

Other types of stabilizers, such as ultraviolet light absorbing ("UVA") materials and hindered amine light stabilizers ("HALS") can be included in the radiation curable inks to provide photolytic stability to the ink, improve the weatherability of the cured ink compositions, and to provide color retention through the lifetime of the cured ink composition. Exemplary UVAs which can be employed herein include, but are not limited to, Tinuvin 384-2, Tinuvin 1130, Tinuvin 405, Tinuvin 41 IL, Tinuvin 171, Tinuvin 400, Tinuvin 928, Tinuvin 99, combinations thereof, and the like. Examples of suitable HALS include, but are not limited to, Tinuvin 123, Tinuvin 292, Tinuvin 144, Tinuvin 152, combinations thereof, and the like. Combination materials having both UVA and HALS may also be used in the radiation curable inks, such as Tinuvin 5055, Tinuvin 5050, Tinuvin 5060, Tinuvin 5151, and the like. All Tinuvin products are commercially available from BASF. Thermal stabilizers such as hindered phenols may optionally be used as an additive in the radiation curable inks. An example of a suitable thermal stabilizer includes, but is not limited to, Irganox 1076, which is commercially available from BASF.

Optical Brightening Agent

The optical brightening agent used herein is preferably selected from stilbines (e.g. divinyl stilbenes; triazine stilbines; stilbene triazoles; stilbene benzoxazoles, etc.); bezoxazoles (e.g. naphthalene benzoxazoles; bis-benzoxazoles; benzoxazole thiophenes, etc.); bisdiphenylethylenes; coumarins; naphthalimides: 1,3,5-trizin-2-yl derivatives; furans; thiophenes (i.e., benzothiophene): and distyryl derivatives (e.g. distyryl biphenyls, distyryl benzenes, etc.). Particularly suitable optical brightening agents are oil-soluble varieties such as some benzoxazoles. One preferred example of an optical brightening agent is TINOPAL OB/UVITEX OB (2,5-thiophenediylbis(5-tert-butyl-1,3-benzoxazole, available from BASF).

Security Taggant

To prevent counterfeiting or unauthorized photocopying, the radiation curable inks may optionally include a security taggant. Suitable security taggants that can be used herein include: naked rare earth (RE) sulfide fused quantum dot, and its glass encapsulated counterparts; naked RE-yttrium co-doped sulfide quantum dot, and their glass encapsulated counterparts; glass encapsulated RE oxide nanocomposite; glass encapsulated RE fluoride nanocomposite; glass encapsulated RE chloride nanocomposite; RE-yttrium co-doped hydroxycarbonate fused quantum dot; holmium doped yttria ceramic: glass encapsulated RE orthophosphates, including holmium orthophosphate ($HoPO_4$) and neodymium orthophosphate ($NdPO_4$) (also referred to as 'holmium phosphate' and 'neodymium phosphate'); naked RE orthophosphates, including holmium phosphate ($HoPO_4$) and neodymium orthophosphate ($NdPO_4$) (also referred to as 'holmium phosphate' and 'neodymium phosphate') as described in US2008/0274028 A1, which is incorporated herein by reference in its entirety. Other useful security taggants include benzothiazoles, rare earth ion chelates such as Eu trifluoroacetate trihydrate, benzoxazins, and benzimidazoles, as described in US2005/0031838 A1.

Photoinitiators

Suitable photocationic initiators that may be optionally included in the radiation curable inks include onium salts, for example, triarylsulfonium salts or diaryl iodonium salts, such as UVI-6974, UVI-6976, UVI-6990 and UVI 6992 (available from the Dow Chemical Company, Midland, Mich.), ADEKA Optomers SP-150, SP-151, SP-170, and SP-171 (Asahi Denka Kogyo, Tokyo, Japan), Omnicat 550, Omnicat 650, Omnicat BL550, Omnicat 440, Omnicat 445, Omnicat 432, Omnicat 430, Omnicat 750, Omnicat 250 (available from IGM resins. Shanghai, China), and DTS-102, DTS-103, NAT-103, NDS-103, TPS-103, MDS-103. MPI-103. BBI-103 (available from Midori Kagaku, Tokyo, Japan), Chivacure 1176, Chivacure 1190, R-gen BF 1172, R-gen 1130, R-gen 261 (available from Chitec Technology Co. Ltd.), Uvacure 1600 (available from Allnex), including combinations and sub-sets thereof. Further, in embodiments where a photocationic initiator is present, the radiation curable inks may also optionally include poly-functional alcohol components such as hexafunctional alcohol BOL-TORN H 2004 (available from Perstorp Specialty Chemicals Toledo, Ohio) to provide improved flexibility and reactivity, chemical resistance, rheological behavior, and ink transfer at high speeds.

Additionally, a photosensitizer may optionally be used, for example, to increase the efficiency of curing by the photocationic initiator. Exemplary photosensitizers include, but are not limited to, Anthracure UVS 1101 (9,10-diethoxy-anthracene) and Anthracure UVS1331 (9,10-dibutoxy anthracene) made by Kawasaki Kasei, Japan, SpeedCure CPTX(1-chloro-4-propoxythioxanthone), made by Lambson, Ltd, U.K., Genocure ITX (Isopropyl thioxanthone) and Genocure DETX (2,4-Diethylthioxanthone), both available from Rahn USA. When present, the radiation curable inks may contain less than about 3 wt. %, preferably less than about 2 wt. %, preferably less than about 1 wt. % of the photosensitizer.

Suitable free-radical photoinitiators that may be optionally included in the radiation curable inks include 2-benzyl-2-(dimethylamino)-4'-morpholinobutyrophenone, 2-hydroxy-2-methylpropiophenone, trimethylbenzophenone, methylbenzophenone, 1-hydroxycyclohexylphenyl ketone, isopropyl thioxanthone, 2,2-dimethyl-2-hydroxy-acetophenone, 2,2-dimethoxy-2-phenylacetophenone, 2-methyl-1-[4-(methylthio)phenyl]-2-morpholino-propan-1-one, 2,4,6-trimethylbenzyl-diphenyl-phosphine oxide, 1-chloro-4-propoxythioxanthone, benzophenone, bis(2,6-dimethoxybenzoyl)-2,4,4-trimethyl pentyl phosphine oxide, 5,7-diiodo-3-butoxy-6-fluorone, ethyl 2,4,6-trimethylbenzoylphenylphosphinate, oxy-phenyl-acetic acid 2-[2-oxo-2-phenyl-acetoxy-ethoxy]-ethyl ester and oxy-phenyl acetic acid 2-[2-hydroxy-ethoxy]-ethyl ester, 1-phenyl-2-hydroxy-2-methyl propanone, bis(2,4,6-trimethylbenzoyl)phenylphosphine oxide, camphorquinone, polymeric photoinitiators such as polymeric benzophenone Genopol BP-2 (Rahn U.S.A.), Omnipol BP, Omnipol SZ, Omnipol BL 801 T. Omnipol 801S, Omnipol BPLV (from IGM resins) and the like. Combinations and sub-sets, comprising one or more the foregoing may also be used. Suitable commercially available photoinitiators include, but are not limited to Omnirad 73, Omnirad 819, Omnirad BDK, Omnirad TPO-L, Omnirad 659, and Omnirad 754 (available from IGM Resins), Methyl benzoylformate (Genocure MBF), Genocure PMP, Genocure BDMM, Genocure CPK, Genocure TPO (available from Rahn U.S.A. Corp, Aurora, Ill.), H-Nu 470, H-Nu 535, H-Nu 635, H-Nu 640, and H-Nu 660 (available from Spectra Group Limited, Millbury, Ohio).

Gloss and Viscosity Control Additives

Additives that can control viscosity and gloss may be included in the radiation curable analog ink compositions herein, and include modified silica, such as precipitated silica ACEMATT OK-412 made by Evonik which is used to control viscosity and also impacts gloss; precipitated silica Cab-O-Sil M5 made by Cabot Corporation which is used to control gloss; micronized waxes made by Shamrock; rheological additives like Thixatrol UV-1104 made by Elementis Specialites; and the like.

Properties

The proportions, types, and combinations of components described above can be controlled to obtain desirable properties, specifically radiation curable inkjet ink compositions and radiation curable analog ink compositions that are compatible in the wet state and are thus suitable for use in the hybrid wet on wet methods described herein. The radiation curable inks, which are compatible in the wet state, are thus capable of forming sharp, clear, high quality images from cured inks having advantageous adhesion and gloss properties, rub and scratch resistance, and low migration tendencies.

The radiation curable inks of the present disclosure provide suitable rub resistance after being cured. Inks exhibiting rub resistance exhibit improved processability, in which the printed substrate can be subjected to further processing without detrimental effect to the printed ink. Rub resistance may be analyzed for example with a Gakushin-type rubbing tester manufactured by Daiei Kagaku, based on reference standard JIS L-0849. The test typically involves placing a reference white cloth on rubbing heads of the rubbing tester. The rubbing heads exert pressure for a number of cycles on the cured ink due to their weight. Depending upon the rub resistance of the ink, the color of the ink will transfer to the reference cloth to a lesser or greater extent. The rub resistance is quantified by measuring the color difference $\Delta E$ after rubbing on the reference cloth by a Spectrophotometer, such as the X-Rite Ci64. The present radiation curable inks have $\Delta E$ value of less than 3.0, which is generally regarded as acceptable, preferably a $\Delta E$ value of less than 2.0, and even more preferably a $\Delta E$ value of less than 1.0.

Adhesion can be measured by a cross hatch adhesion tape test according to ASTM D3359 and quantified on a 0-5 scale. The radiation curable inks provide advantageous adhesion properties on a variety of substrates, with adhesion performance ratings of 3 to 5, preferably 4 to 5.

The scratch resistance properties of the radiation curable inks, after being cured, may be analyzed by pencil hardness tests, for example with standard ASTM3363-92a, and rated on a scale of softest to hardest: 6B, 5B, 4B, 3B, 2B, B, HB, F. H, 2H, 3H, 4H, 5H, 6H, 7H, 8H, 9H. In some embodiments, the radiation curable inks provide suitable scratch resistance ratings of at least "B" hardness, preferably at least "HB", more preferably at least "F", even more preferably at least "H", yet even more preferably at least "2H".

Inks to be used on food packaging should not contaminate the food or impart any unnatural odor. Contamination, in this context, can result from migration of components of an ink into the foodstuff or other packaged material or from undesirable odors imparted to the packaged material by the ink. Migration of ink components into foodstuffs or pharmaceuticals may present a health risk and consequently should be kept to a minimum. Several food packaging regulations and guidelines exist which provide listings of acceptable ink components as well as stipulations regarding acceptable levels of migration (e.g., the European Printing Ink Association (EuPIA) and associated GMP guidelines EuPIA Inventory List 2012, Swiss Ordinance on Materials and Articles in Contact with Food, SR 817 023.21, Nestle Guidance Notes, FDA Title 21 CFR or FCN—Food Contact Notification). Specific migration limits (SML) of consumer product packaging inks are typically below 50 ppb and sometimes migration levels below 10 ppb are required.

The migration levels of the radiation curable inks disclosed herein may be determined using migration testing standards known to those of ordinary skill in the art. Briefly, such analyses may involve stacking several sheets of printed samples, or alternatively cutting a printed sample from the rewind side of a substrate in a roll form web as the test specimen, and conditioning the test specimen in an extraction cell (generally ranging from 30 minutes to 10 days) filled with a food simulant (e.g., water, heptane, isooctane, vegetable oil, ethanol or acetic acid solutions, etc.) according to FDA "Conditions of Use" regulations as defined in Title 21 Code of Federal Regulations (C.F.R.) Section 176.170(c)-(d), Apr. 1, 2000, which specify the testing conditions (e.g., temperature and length of time) for which the test specimen is stored in the extraction cell depending on the intended use of a particular packaged product. After conditioning, any ink components from the test specimen may optionally be extracted with an extraction solvent (e.g., chloroform, methylene chloride). The levels of migration of the ink components may then be quantified with various analytical techniques, such as by weight, gas chromatography, liquid chromatography, mass spectrometry, elemental analysis, and the like. The exact technique used to measure the amount of migration will depend on the intended use of a particular packaged product. For example, if the package is intended to be used for frozen storage (no thermal treatment in the container), the migration is measured by condition of use "G" according to Table 2 of Title 21 Code of Federal Regulations (C.F.R.) Section 176.170(c) and Section 176.170(d). If the package has multiple intended uses, the package satisfies the migration level for the appropriate test for at least one of the intended uses.

In some embodiments, the radiation curable inks disclosed herein exhibit a migration level of less than 50 ppb, preferably less than 40 ppb, preferably less than 30 ppb, preferably less than 20 ppb, more preferably less than 10 ppb, even more preferably less than 5 ppb, yet even more preferably less than 1 ppb, after being cured on an article. In some embodiments, the radiation curable inks, after being cured, exhibit no migration and/or the ink components cannot be detected above the detection limit of the analytical technique employed.

A glossmeter provides a quantifiable way of measuring gloss intensity ensuring consistency of measurement by defining the precise illumination and viewing conditions. The configuration of both illumination source and observation reception angles allows measurement over a small range of the overall reflection angle. The measurement results of a glossmeter are related to the amount of reflected light from a black glass standard with a defined refractive index. The ratio of reflected to incident light for the specimen, compared to the ratio for the gloss standard, is recorded as gloss units (GU). Measurement angle refers to the angle between the incident light and the perpendicular. Three measurement angles (20°, 60°, and 85°) are specified to cover the majority of industrial coatings applications. The angle is selected based on the anticipated gloss range, with high gloss being a 60° value of >70 GU, medium gloss being a 60° value of 10 to 70 GU, and low gloss being a 60° value of <10 GU. For most test specimens, gloss is measured at a 60 degree angle (specular reflection) using a BYK-Gardner haze-gloss reflectometer (BYK-Gardner Geretsiried, Germany) according to ASTM D523 for coatings, plastics, and related materials and TAPPI T480 for paper substrates. In preferred embodiments, the radiation curable analog ink compositions, after curing, have a medium to low gloss rating, i.e., a GU of less than 25, preferably less than 20, more preferably less than 15, even more preferably less than 10, yet even more preferably less than 5. In other preferred embodiments, the radiation curable inkjet ink compositions, after curing, have a medium to high gloss rating, i.e., a GU of at least 50, preferably at least 60, more preferably at least 70, even more preferably at least 75 and up to 90, preferably up to 80.

Acceptable image clarity or overall image quality can be determined through simple visual inspection of the formed images or by using image clarity software known by those of ordinary skill in the art, for example, PIAS-II.

The examples below are intended to further illustrate radiation curable inks used in the present methods and are not intended to limit the scope of the claims.

EXAMPLES

Example 1

TABLE 1

Radiation curable inkjet ink composition 1

| | Type | CAS# | Source | wt. % |
|---|---|---|---|---|
| CN2303 | Oligomer | n/a | Sartomer | 22.00 |
| Irganox 1035 | Stabilizer | 41484-35-9 | BASF | 0.25 |
| TINOPAL OB/ UVITEX OB | Optical brightening agent | 7128-64-5 | BASF | 0.20 |
| MeHQ | Stabilizer | 150-76-5 | Sigma Aldrich | 0.05 |
| TEGO RAD 2300 | Surfactant | n/a | Tego Evonik | 2.00 |
| SR9003B | Monomer | 84170-74-1 | Sartomer | 28.50 |
| Miramer M200-HDDA | Monomer | 13048-33-4 | Rahn | 45.00 |
| EBECRYL 1360 | Surfactant | n/a | Allnex | 1.00 |
| Byk-377 | Surfactant | 556-67-2 | Byk Chemie | 1.00 |

Example 2

TABLE 2

Radiation curable inkjet ink composition 2

| | Type | CAS# | Source | wt. % |
|---|---|---|---|---|
| EBECRYL LEO 10551 | Oligomer | n/a | Allnex | 22.00 |
| TINOPAL OB/ UVITEX OB | Optical brightening agent | 7128-64-5 | BASF | 0.20 |
| MeHQ | Stabilizer | 150-76-5 | Sigma Aldrich | 0.05 |

TABLE 2-continued

Radiation curable inkjet ink composition 2

| | Type | CAS# | Source | wt. % |
|---|---|---|---|---|
| TEGO RAD 2300 | Surfactant | n/a | Tego Evonik | 2.00 |
| SR9003B | Monomer | 84170-74-1 | Sartomer | 37.50 |
| SR420 | Monomer | 86178-38-3 <95%, 116-02-9 <5%, 79-10-7 <0.1% | Sartomer | 36.25 |
| EBECRYL 1360 | Surfactant | n/a | Allnex | 1.00 |
| Byk-377 | Surfactant | 556-67-2 | Byk Chemie | 1.00 |

Examples 1 and 2 were prepared by mixing all raw materials with a stirrer until the solid MeHQ was dissolved and all liquid components were mixed uniformly.

Example 3

TABLE 3

Radiation curable inkjet ink composition 3

| | Type | CAS# | Source | wt. % |
|---|---|---|---|---|
| EBECRYL LEO 10551 | Oligomer | n/a | Allnex | 14.20 |
| TINOPAL OB/ UVITEX OB | Optical brightening agent | 7128-64-5 | BASF | 0.14 |
| MeHQ | Stabilizer | 150-76-5 | Sigma Aldrich | 0.04 |
| TEGO RAD 2300 | Surfactant | n/a | Tego Evonik | 2.00 |
| SR9003B | Monomer | 84170-74-1 | Sartomer | 26.24 |
| SR420 | Monomer | 86178-38-3 <95%, 116-02-9 <5%, 79-10-7 <0.1% | Sartomer | 25.38 |
| EBECRYL 1360 | Surfactant | n/a | Allnex | 1.00 |
| Byk-377 | Surfactant | 556-67-2 | Byk Chemie | 1.00 |
| RDI-S Titanium Dioxide Dispersed in SR9003B | Colorant | 84170-74-1 | Sachtleben | 30.00 |

To prepare Example 3, all raw materials except the colorant were added in a container and stirred with a mixer until the solids were dissolved and a uniform mix is obtained. Then the colorant, which was a white pigment dispersed in SR9003B monomer, was added and the mix was stirred until a uniform mix was obtained.

Example 4

TABLE 4

Radiation curable inkjet ink composition 4

| | Type | CAS# | Source | wt. % |
|---|---|---|---|---|
| CN2303 | Oligomer | n/a | Sartomer | 22.92 |
| Irganox 1035 | Stabilizer | 41484-35-9 | BASF | 0.26 |
| TINOPAL OB/ UVITEX OB | Optical brightening agent | 7128-64-5 | BASF | 0.21 |
| MeHQ | Stabilizer | 150-76-5 | Sigma Aldrich | 0.05 |
| SR9003B | Monomer | 84170-74-1 | Sartomer | 29.68 |
| Miramer M200-HDDA | Monomer | 13048-33-4 | Rahn | 46.88 |

Example 4 was prepared by mixing all raw materials with a stirrer until the solid MeHQ was dissolved and all liquid components were mixed uniformly.

Example 5

TABLE 5

Radiation curable analog ink composition 1

| | Type | CAS# | Source | wt. % |
|---|---|---|---|---|
| EBECRYL 1290 | Oligomer | n/a | Allnex | 39.00 |
| Miramer M200-HDDA | Monomer | 13048-33-4 | Rahn | 28.00 |
| Miramer M300-TMPTA | Monomer | 15625-89-5 | Rahn | 28.00 |
| Acematt OK-412 | Gloss and viscosity control additive | 112926-00-8, 7631-86-9 (<100%); 9002-88-4 (5-8%) | Evonik | 5.00 |

Example 6

TABLE 6

Radiation curable analog ink composition 2

| | Type | CAS# | Source | wt. % |
|---|---|---|---|---|
| EBECRYL 1290 | Oligomer | n/a | Allnex | 38.00 |
| Miramer M200-HDDA | Monomer | 13048-33-4 | Rahn | 27.00 |
| Miramer M300-TMPTA | Monomer | 15625-89-5 | Rahn | 27.00 |
| Acematt OK-412 | Gloss and viscosity control additive | 112926-00-8, 7631-86-9 (<100%); 9002-88-4 (5-8%) | Evonik | 5.00 |
| Byk-UV 3500 | Surfactant | n/a | Byk Chemie | 3.00 |

Example 5 and 6 were prepared by mixing the oligomer and monomers with an electric stirrer until the mix is homogenous. The gloss and viscosity control agent was added slowly while mixing. The mixing was continued until a smooth, homogenous mix was obtained and then the surfactant (in the case of Example 6) was added and mixed again. A small sample of the mixed composition was placed on a Fineness of Grind gage such as the NPIRI Grind Gage and measured to ensure that the particle size was less than 5 microns.

Example 7

Radiation curable analog ink composition 3 in Table 7 below is a typical example of an analog ink (Matte flexo clear ink) that can be used in the disclosed hybrid wet on wet printing process herein.

TABLE 7

Radiation curable analog ink composition 3

| | Type | CAS# | Source | wt. % |
|---|---|---|---|---|
| EBECRYL 1290 | Oligomer | n/a | Allnex | 39.00 |
| SR238-HDDA | Monomer | 13048-33-4 | Sartomer | 27.50 |
| Miramer M300-TMPTA | Monomer | 15625-89-5 | Rahn | 27.50 |
| Acematt OK-412 | Gloss and viscosity control additive | 112926-00-8, 7631-86-9 (<100%); 9002-88-4 (5-8%) | Evonik | 5.00 |
| Byk-UV 3500 | Surfactant | n/a | Byk Chemie | 1.00 |

To prepare the radiation curable analog ink composition 3, the monomers, oligomer, and surfactant were mixed until uniform, then ACEMATT OK-412 was added gradually under high speed mixing until it was uniformly dispersed.

Ink Viscosity at 25° C.: 220-250 cPs.

This ink was applied by a flexo applicator on a Leneta test Chart at a film thickness of 5 microns and cured at an EB dose of 3 MR.

The cured ink had a gloss of 55% at 60 degrees using a Byk Gloss meter.

Ink Properties

TABLE 8

Viscosity and surface tension properties of Examples 1-6

| Ink | Viscosity at 25° C., cPs | Surface Tension, mN/m |
|---|---|---|
| Example 1 | 17.56 | 22.7 |
| Example 2 | 12.48 | 23.5 |
| Example 3 | 18.50 | 23.5 |
| Example 4 | 14.98 | 33.5 |
| Example 5 | 276.6 | 33.5 |
| Example 6 | 540.6 | 21.9 |

Viscosity at 25° C. (cPs)

The viscosity of the radiation curable inkjet and analog inks was measured by a viscometer which such as the DV-E Viscometer made by Brookfield Engineering Laboratories, Middleboro, MA, USA. This instrument has a rotating spindle which is immersed in the ink. The torque measured by the spindle is converted to viscosity. The instrument displays viscosity, spindle number and speed. A water-cooled jacket keeps the ink sample at a constant temperature. The speed and spindle can be changed to match the viscosity being measured.

Surface Tension (mN/m)

The surface tension of the radiation curable inkjet ink compositions and the radiation curable analog ink compositions was measured at 25° C. by a surface tensiometer made by Kruss GmBH, trade name K20 Easy Dyne. This instrument can measure the surface tension of the radiation curable inks by using different measuring devices. For measuring the surface tension of radiation curable inkjet ink composition, a deNouy ring is used in the K20 and for the radiation curable analog ink composition, a Wilhelmy plate is used.

Evaluation

The print sequence of various analog and inkjet inks (Examples 1, 2, 5, and 6) was evaluated in the hybrid wet on wet method and the results are displayed in Table 9 below.

TABLE 9

Print sequence evaluation

Print Sequence

Print Sequence: Analog + Inkjet

| | Analog Component | Inkjet Component | Print Quality |
|---|---|---|---|
| Example: | 5 | 1 | Good |
| Comparative Example: | 6 | 2 | Poor; beading |

Print Sequence: Inkjet + Analog

| | Inkjet Component | Analog Component | Print Quality |
|---|---|---|---|
| Example: | 2 | 6 | Good |
| Comparative Example: | 1 | 5 | Poor; beading |

By applying an ink with higher surface tension first and then an ink with lower surface tension, a good print quality is obtained (see Examples in Table 9). If the sequence is reversed and an ink with lower surface tension is printed first followed by an ink with higher surface tension, the print quality is poor due to beading up of the ink with higher surface tension on the surface of the first ink (see comparative Examples in Table 9).

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of forming an image on a substrate, comprising:
   applying a radiation curable analog ink composition by an analog printing method onto a surface of the substrate to form a coated substrate;
   applying a radiation curable inkjet ink composition by a digital printing method onto the coated substrate while the radiation curable analog ink composition is still wet to form a hybrid coated substrate; and
   exposing the hybrid coated substrate to electron beam radiation to at least partially cure the radiation curable analog ink composition and the radiation curable inkjet ink composition
   wherein the radiation curable inkjet ink composition has a surface tension that is lower than a surface tension of the radiation curable analog ink composition.

2. The method of claim 1, wherein the radiation curable analog ink composition, the radiation curable inkjet ink composition, or both comprises an ethylenically unsaturated oligomer and an ethylenically unsaturated monomer.

3. The method of claim 2, wherein the radiation curable analog ink composition, the radiation curable inkjet ink composition, or both further comprises at least one of a surfactant, a colorant, a stabilizer, a gloss and viscosity control additive, an optical brightening agent, and a security taggant.

4. The method of claim 2, wherein an amount of the ethylenically unsaturated oligomer in the radiation curable inkjet ink composition is at least 16 wt. %.

5. The method of claim 1, wherein the analog printing method is a flexographic printing method or a gravure printing method.

6. The method of claim 1, wherein the digital printing method is a piezoelectric inkjet printing method.

7. The method of claim 1, wherein the image comprises a cured analog ink composition and a cured inkjet ink composition, and wherein the cured analog ink composition and the cured inkjet ink composition are distinguishable by at least one physical attribute selected from the group consisting of color and gloss.

8. The method of claim 1, wherein the substrate is a packaging material.

9. The method of claim 1, wherein the radiation curable inkjet ink composition has a surface tension that is at least 1.5 mN/m lower than a surface tension of the radiation curable analog ink composition.

10. The method of claim 1, wherein the coated substrate is not cured or pinned.

11. A method of forming an image on a substrate, comprising:
    applying a radiation curable inkjet ink composition by a digital printing method onto a surface of the substrate to form a coated substrate;
    applying a radiation curable analog ink composition by an analog printing method onto the coated substrate while the radiation curable inkjet ink composition is still wet to form a hybrid coated substrate; and
    exposing the hybrid coated substrate to electron beam radiation to at least partially cure the radiation curable inkjet ink composition and the radiation curable analog ink composition;
    wherein the radiation curable inkjet ink composition has a surface tension that is higher than a surface tension of the radiation curable analog ink composition.

12. The method of claim 11, wherein the radiation curable analog ink composition, the radiation curable inkjet ink composition, or both comprises an ethylenically unsaturated oligomer and an ethylenically unsaturated monomer.

13. The method of claim 12, wherein the radiation curable analog ink composition, the radiation curable inkjet ink composition, or both further comprises at least one of a surfactant, a colorant, a stabilizer, a gloss and viscosity control additive, an optical brightening agent, and a security taggant.

14. The method of claim 11, wherein the analog printing method is a flexographic printing method or a gravure printing method.

15. The method of claim 11, wherein the digital printing method is a piezoelectric inkjet printing method.

16. The method of claim 11, wherein the image comprises a cured analog ink composition and a cured inkjet ink composition, and wherein the cured analog ink composition and the cured inkjet ink composition are distinguishable by at least one physical attribute selected from the group consisting of color and gloss.

17. The method of claim 11, wherein the substrate is a packaging material.

18. The method of claim 11, wherein the radiation curable inkjet ink composition has a surface tension that is at least 1.5 mN/m higher than a surface tension of the radiation curable analog ink composition.

19. The method of claim 11, wherein the coated substrate is not cured or pinned.

20. The method of claim 12, wherein an amount of the ethylenically unsaturated oligomer in the radiation curable inkjet ink composition is at least 16 wt. %.

* * * * *